United States Patent
Chang

(10) Patent No.: US 8,270,369 B1
(45) Date of Patent: Sep. 18, 2012

(54) SERVICE DATA UNIT DISCARD SYSTEM FOR RADIO ACCESS NETWORKS

(75) Inventor: Ilwoo Chang, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 897 days.

(21) Appl. No.: 12/267,958

(22) Filed: Nov. 10, 2008

Related U.S. Application Data

(60) Provisional application No. 60/988,589, filed on Nov. 16, 2007.

(51) Int. Cl.
H04L 12/56 (2006.01)
H04W 4/00 (2009.01)
H04W 36/00 (2009.01)
H04W 72/00 (2009.01)

(52) U.S. Cl. ........ 370/331; 370/328; 370/332; 370/394; 370/254; 370/401; 455/436; 455/412.1; 455/452.2

(58) Field of Classification Search ........... 370/328–442
See application file for complete search history.

(56) References Cited

U.S. PATENT DOCUMENTS

| | | | | |
|---|---|---|---|---|
| 5,936,949 | A * | 8/1999 | Pasternak et al. | 370/328 |
| 6,201,811 | B1 * | 3/2001 | Larsson et al. | 370/310.1 |
| 7,171,215 | B2 * | 1/2007 | Khouaja et al. | 455/452.2 |
| 7,266,101 | B2 * | 9/2007 | Dorenbosch | 370/331 |
| 7,346,025 | B2 * | 3/2008 | Bryson | 370/328 |
| 7,388,883 | B2 * | 6/2008 | Jiang | 370/470 |
| 7,646,777 | B2 * | 1/2010 | Hicks et al. | 370/401 |
| 7,693,099 | B2 * | 4/2010 | Gollamudi et al. | 370/328 |
| 7,848,513 | B2 * | 12/2010 | Yun et al. | 380/27 |
| 7,876,704 | B1 * | 1/2011 | Bims et al. | 370/254 |
| 7,944,944 | B2 * | 5/2011 | Jiang | 370/470 |
| 2003/0223385 | A1 * | 12/2003 | Jiang | 370/324 |
| 2004/0185777 | A1 * | 9/2004 | Bryson | 455/41.1 |
| 2004/0246898 | A1 * | 12/2004 | Peisa et al. | 370/235 |

(Continued)

FOREIGN PATENT DOCUMENTS

WO WO 9949695 A1 * 9/1999

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999; 531 pages.

(Continued)

Primary Examiner — Ayaz Sheikh
Assistant Examiner — Venkatesh Haliyur

(57) ABSTRACT

A network device includes a transceiver that transmits N packets to a first access point and that receives a control message from a second access point. The control message indicates reception of one of the N packets by the second access point from the first access point during a handover of the network device from the first access point to the second access point. N is an integer. A control module causes the transceiver to refrain from transmitting the one of the N packets to the second access point based on the control message. The handover of the network device from the first access point to the second access point occurs prior to the control message being received by the transceiver.

13 Claims, 12 Drawing Sheets

U.S. PATENT DOCUMENTS

| | | | |
|---|---|---|---|
| 2004/0264414 A1* | 12/2004 | Dorenbosch | 370/332 |
| 2005/0147062 A1* | 7/2005 | Khouaja et al. | 370/332 |
| 2006/0099933 A1* | 5/2006 | Benveniste | 455/412.1 |
| 2006/0209970 A1* | 9/2006 | Kanterakis | 375/259 |
| 2006/0268799 A1* | 11/2006 | Huang et al. | 370/338 |
| 2007/0026862 A1* | 2/2007 | Hicks et al. | 455/436 |
| 2007/0154017 A1* | 7/2007 | Yun et al. | 380/270 |
| 2007/0184840 A1* | 8/2007 | Zhang et al. | 455/442 |
| 2008/0045224 A1* | 2/2008 | Lu et al. | 455/446 |
| 2008/0062925 A1* | 3/2008 | Mate et al. | 370/331 |
| 2008/0085711 A1* | 4/2008 | Alberi-Morel et al. | 455/437 |
| 2008/0089287 A1* | 4/2008 | Sagfors et al. | 370/331 |
| 2008/0146231 A1* | 6/2008 | Huang et al. | 455/436 |
| 2008/0170522 A1* | 7/2008 | Sammour et al. | 370/310 |
| 2008/0253297 A1* | 10/2008 | Hulbert | 370/252 |
| 2008/0279218 A1* | 11/2008 | Jiang | 370/470 |
| 2008/0285566 A1* | 11/2008 | Sammour et al. | 370/394 |
| 2009/0097425 A1* | 4/2009 | Sammour et al. | 370/310 |
| 2009/0103478 A1* | 4/2009 | Sammour et al. | 370/328 |
| 2009/0116426 A1* | 5/2009 | Ho | 370/328 |
| 2009/0129315 A1* | 5/2009 | Meylan | 370/328 |
| 2009/0310534 A1* | 12/2009 | Lindskog et al. | 370/328 |
| 2010/0238903 A1* | 9/2010 | Kitazoe | 370/332 |
| 2010/0322128 A1* | 12/2010 | Becker et al. | 370/312 |

OTHER PUBLICATIONS

IEEE P802.11g/D8.2, Apr. 2003 (Supplement to ANSI/IEEE Std 802.11-1999(Reaff 2003)); DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d ™-2001, 802.11g™-2003]; IEEE Standard for Information technology—Telecommunications and information exchange between systems—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003; 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Mobile IPv6 support for dual stack Hosta and Routers (DSMIPv6); draft-ietf-mip6-nemo-v4traversal-06.txt; Hesham Soliman (Ed.), Elevate Technologies; Nov. 2007; 28 pages.

Mobility Management using Proxy Mobile IPv4; draft-leung-mip4-proxy-mode-02.txt; K. Leung, G. Dommety, P. Yegani, Cisco Systems, K. Chowdhury, Starent Networks; Jan. 10, 2007; 16 pages.

Localized Mobility Mangement using Proxy Mobile IPv6; draft-gundavalli-netlmm-mip6-proxy-00.txt; S. Gundavelli, K. Leung, Cisco Systems; Nov. 8, 2005; 30 pages.

RFC 3775; Mobility Support in IPv6; D. Johnson, Rice University, C. Perkins, Nokia Research Center, J. Arkko, Ericsson; Jun. 2004; 165 pages.

RFC 3344; IP Mobility Support for IPv4; C. Perkins, Ed., Nokia Research Center; Aug. 2002; 99 pages.

ETSI TS 125 322 V4.3.0 (Dec. 2001); Universal Mobile Telecommunications System (UMTS); Radio Link Control (RLC) protocol specification (3GPP TS 25.322 version 4.3.0 Release 4); 73 pages.

3GPP TS 23.401 V1.3.0 (Oct. 2007); 3$^{rd}$ Generation Partnership Project; Technical Specification Group Services and System Aspects; GPRS enhancements for E-UTRAN access (Release 8); 136 pages.

3GPP TS 23.402 V1.4.0 (Oct. 2007); 3rd Generation Partnership Project; Technical Specification Group Services and System Aspects; Architecture Enhancements for non-3GPP accesses (Release 8); 125 pages.

3GPP TS 22.278 V8.3.0 (Sep. 2007); 3rd Generation Partnership Project; Technical Specification Group Services and System Aspects; Service requirements for the Evolved Packet System (EPS) (Release 8); 17 pages.

3GPP TS 23.060 V7.5.0 (Sep. 2007); 3rd Generation Partnership Project; Technical Specification Group Services and System Aspects; General Packet Radio Service (GPRS); Service description; Stage 2 (Release 7); 216 pages.

3GPP TS 25.301 V6.5.0 (Sep. 2007); 3rd Generation Partnership Project; Technical Specification Group Radio Access Network; Radio Interface Protocol Architecture (Release 6); 48 pages.

3GPP TS 25.322 V7.4.0 (Sep. 2007); 3rd Generation Partnership Project; Technical Specification Group Radio Access Network; Radio Link Control (RLC) protocol specification (Release 7); 88 pages.

* cited by examiner

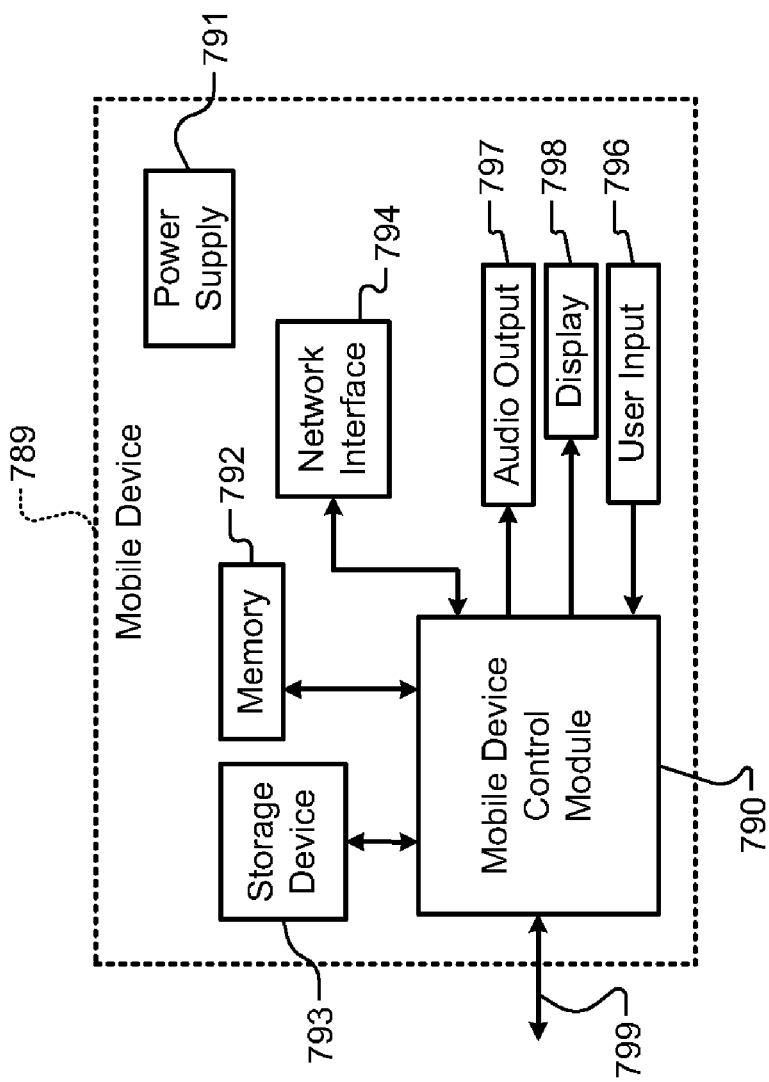

SERVICE DATA UNIT DISCARD SYSTEM FOR RADIO ACCESS NETWORKS

CROSS-REFERENCE TO RELATED APPLICATIONS

This application claims the benefit of U.S. Provisional Application No. 60/988,589, filed on Nov. 16, 2007. The disclosure of the above application is incorporated herein by reference in its entirety.

FIELD

The present disclosure relates to communication systems, and more particularly to protocols for managing handover events.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In the standardization of evolved $3^{rd}$ Generation Partnership Project (3GPP™) networks, 3GPP™ system architecture evolution (SAE) work is defining a new architecture where both evolved 3GPP™ wireless access (LTE—Long Term Evolution access) and non-3GPP™ accesses are considered. The technical specification (TS) 23.401 "3GPP™ GPRS enhancements for LTE access" [1] and the TS 23.402 "3GPP™ Architecture enhancements for non-3GPP™ accesses" [2], which are incorporated herein by reference in their entirety, contain the current definitions for the architecture and related mechanisms. Specifically, [1] covers one possible implementation of the SAE network that supports LTE accesses, and [2] describes an alternative implementation of the SAE network that supports both LTE and non-3GPP™ accesses.

In a long-term evolution radio access network (LTE RAN), user data packets are transmitted and received between user equipment (UE) and base stations (such as evolved Node-B stations). The user data packets are transmitted and received using protocol stacks that are associated with the UE and the base stations. The protocol stacks each include three service and function layers L1, L2 and L3. The first layer is the bottom most layer and the third layer is the upper most layer. The L1 layer includes a physical layer (PHY). The L2 layer includes a medium access layer (MAC), a radio link control layer (RLC), and a packet data convergence layer (PDCP). The L3 layer includes an Internet protocol layer (IP).

During, for example, an uplink from the UE to a first base station $BS_1$, user data packets are transmitted from the UE to the first base station $BS_1$. When the first base station $BS_1$ successfully receives the user data packets, the first base station $BS_1$ transmits an acknowledgement signal (ACK) to the UE indicating a successful transmission.

Under certain conditions, the UE may not receive the acknowledgement (ACK) signal and may time out. This may result in the user data packets being discarded by the transmitter of the UE. In a LTE RAN, and with respect to a real-time application, the transmitter of the UE sets a timer in association with each of the user data packets. Examples of real-time applications are voice over Internet phone (VoIP) or streaming. When the UE does not receive an ACK signal within a predetermined period after transmission of a corresponding user data packet, the UE times out and discards the user data packet.

During a handover between the first base station $BS_1$ of a first radio access network (RAN) and a second base station $BS_2$ of a target RAN, radio communication between the UE and the first base station $BS_1$ may deteriorate. When a UE is near the outer boundary of the first RAN, radio transmission degrades. As a result of the handover and deteriorated radio communication, the UE may not receive an ACK signal with regard to certain transmitted packets. Thus, the UE may retransmit the packets to the second base station $BS_2$ regardless of whether the first base station $BS_1$ successfully received the packets.

SUMMARY

In one embodiment, a network device is provided that includes a transceiver that transmits N packets to a first access point and that receives a control message from a second access point. The control message indicates reception of one of the N packets by the second access point from the first access point during a handover of the network device from the first access point to the second access point. N is an integer. A control module causes the transceiver to refrain from transmitting the one of the N packets to the second access point based on the control message. The handover of the network device from the first access point to the second access point occurs prior to the control message being received by the transceiver.

In other features, the transceiver transmits the one of the N packets to the second access point prior to the control message being received by the transceiver. The control message indicates reception of a redundant packet by the second access point based on reception of the one of the N packets by the second access point.

In still other features, the N packets include a first packet and a second packet. The control message indicates reception of one of the first packet and the second packet by the first access point. The control module causes the transceiver to refrain from transmitting the other one of the first packet and the second packet to the second access point based on the control message.

In other features, the first access point receives the one of the N packets in a first radio access network and the second access point receives the one of the N packets in a second radio access network. In yet other features, the control message is at least one of initially generated within a packet data convergence protocol layer of the second access point and initially generated as a packet data convergence protocol layer control packet data unit.

In other features, the transceiver transmits a first set of service data units to the first access point. The first set of service data units includes the N packets. The transceiver transmits a second set of service data units to the second access point. The second set of service data units includes the one of the N packets.

In still other features, the transceiver receives the control message prior to transmitting the one of the N packets to the second access point. In other features, the transceiver receives the control message prior to transmitting the N packets to the second access point. The control module causes the transceiver to refrain from transmitting the N packets to the second access point based on the control message.

In other features, the control message indicates reception of M of the N packets, where M is an integer. The control module causes the transceiver to refrain from transmitting the M of the N packets to the second access point.

In other features, the transceiver transmits the one of the N packets to the second access point based on reception of an acknowledgement signal from the first access point. In other features, the transceiver discards at least one of the N packets after a predetermined period. In yet other features, the transceiver transmits the one of the N packets to the second access point based on expiration of a predetermined time period.

In other features, a target access point is provided that includes a transceiver that receives one of N packets associated with a service request device. The one of the N packets is received by the transceiver from a first access point during a handover of the service request device from the first access point to the target access point. The N packets are transmitted from the service request device to the first access point and N is an integer. A control module generates a control message. The control message indicates reception of the one of the N packets by the transceiver. The transceiver transmits the control message to the service request device to prevent the service request device from transmitting the one of the N packets to the target access point.

In other features, the service request device transmits the N packets to the first access point prior to the handover of the service request device from the first access point to the target access point. In still other features, the transceiver receives the one of the N packets from the service request device prior to the control message being transmitted by the transceiver. The control message indicates reception of a redundant packet by the transceiver based on the reception of the one of the N packets from the service request device.

In yet other features, the N packets include a first packet and a second packet. The control message indicates reception of one of the first packet and the second packet by the first access point. The control module causes the transceiver to transmit the control message to the service request device to prevent the service request device from transmitting the other one of the first packet and the second packet to the transceiver based on the control message.

In other features, the first access point receives the one of the N packets in a first radio access network. The transceiver receives the one of the N packets in a second radio access network. In other features, the control message is at least one of initially generated within a packet data convergence protocol layer of the transceiver and initially generated as a packet data convergence protocol layer control packet data unit.

In other features, the control message indicates reception of M of the N packets by the transceiver. M is an integer. The service request device discards the M of the N packets based on the control message. In other features, the transceiver receives the one of the N packets from the service request device based on reception of an acknowledgement signal by the service request device from the first access point.

In yet other features, the transceiver receives the control message after transmitting the one of the N packets to the second access point and before transmitting N−1 of the N packets to the second access point. In still other features, the transceiver refrains from transmitting a packet of the N packets other than the one of the N packets based on the control message. In other features, the control module causes the transceiver to discard the M of the N packets based on the control message.

In other features, the transceiver receives the control message in a long-term evolution radio access network. In other features, the transceiver discards at least one of the N packets a predetermined period after from reception of the at least one of the N packets by the transceiver.

In other features, the transceiver transmits a discard message to the second access point. The discard message indicates transmission of at least one of the N packets to the second access point, discarding of the at least one of the N packets, and adjustment of a message window. In other features, a network is provided that includes the network device and further includes the second access point.

In other features, the control message is initially generated as a packet data convergence protocol layer control packet data unit. In other features, the transceiver receives a first set of service data units from the first access point that include the one of the N packets. The transceiver also receives a second set of service data units from the service request device that include the one of the N packets.

In yet other features, the first set of service data units include X packets and the second set of service data units includes Y packets. X and Y are integers and the X packets are independent of the Y packets other than the inclusion of the one of the N packets.

In other features, the transceiver transmits the control message before receiving the one of the N packets from the service request device. In other features, the transceiver transmits the control message before receiving the N packets from the service request device.

In other features, the transceiver transmits the control message after receiving the one of the N packets from the service request device and before receiving N−1 of the N packets from the service request device. In other features, the transceiver transmits the control message in a long-term evolution radio access network.

In still other features, the transceiver discards at least one of the N packets after a predetermined period. In other features, the transceiver receives the one of the N packets from the service request device based on expiration of a predetermined period.

In yet other features, the transceiver receives a discard message from the service request device. The discard message indicates transmission of at least one of the N packets to the transceiver, discarding of the at least one of the N packets by the service request device, and adjustment of a message window. In other features, a network is provided that includes the target access point and further includes the service request device.

In other features, a method of operating a network device is provided that includes transmitting N packets to a first access point that receives a control message from a second access point via a transceiver. The control message indicates reception of one of the N packets by the second access point from the first access point during a handover of the network device from the first access point to the second access point. N is an integer. The transceiver refrains from transmitting the one of the N packets to the second access point based on the control message. The handover of the network device from the first access point to the second access point occurs prior to the control message being received by the transceiver.

In other features, the one of the N packets is transmitted to the second access point prior to the control message being received by the transceiver. The control message indicates reception of a redundant packet by the second access point based on reception of the one of the N packets by the second access point.

In yet other features, the transceiver refrains from transmitting the other one of the first packet and the second packet to the second access point based on the control message, the N packets include a first packet and a second packet, and the control message indicates reception of one of the first packet and the second packet by the first access point.

In other features, the first access point receives the one of the N packets in a first radio access network and the second access point receives the one of the N packets in a second radio access network. In still other features, the control message is at least one of initially generated within a packet data convergence protocol layer of the second access point and initially generated as a packet data convergence protocol layer control packet data unit.

In other features, a first set of service data units is transmitted to the first access point. The first set of service data units includes the N packets. A second set of service data units is transmitted to the second access point. The second set of service data units includes the one of the N packets.

In other features, the control message is received by the transceiver prior to transmitting the one of the N packets to the second access point. In other features, the transceiver refrains from transmitting the N packets to the second access point based on the control message. The transceiver receives the control message prior to transmitting the N packets to the second access point.

In yet other features, the transceiver refrains from transmitting the M of the N packets to the second access point. The control message indicates reception of M of the N packets. M is an integer.

In other features, the one of the N packets are transmitted to the second access point based on reception of an acknowledgement signal from the first access point. In other features, at least one of the N packets is discarded after a predetermined period. In other features, the one of the N packets is transmitted to the second access point based on expiration of a predetermined time period.

In other features, a method of operating a target access point is provided and includes receiving one of N packets associated with a service request device via a transceiver. The one of the N packets is received by the transceiver from a first access point during a handover of the service request device from the first access point to the target access point. The N packets are transmitted from the service request device to the first access point and N is an integer. A control message is generated. The control message indicates reception of the one of the N packets by the transceiver. The control message is transmitted to the service request device to prevent the service request device from transmitting the one of the N packets to the target access point.

In still other features, the N packets are transmitted to the first access point prior to the handover of the service request device from the first access point to the target access point. In other features, the one of the N packets is received from the service request device prior to the control message being transmitted by the transceiver. The control message indicates reception of a redundant packet by the transceiver based on the reception of the one of the N packets from the service request device.

In yet other features, the N packets include a first packet and a second packet. The control message indicates reception of one of the first packet and the second packet by the first access point. The control message is transmitted to the service request device to prevent the service request device from transmitting the other one of the first packet and the second packet to the transceiver based on the control message.

In other features, the first access point receives the one of the N packets in a first radio access network and the transceiver receives the one of the N packets in a second radio access network. In other features, the control message is at least one of initially generated within a packet data convergence protocol layer of the transceiver and initially generated as a packet data convergence protocol layer control packet data unit.

In other features, the control message indicates reception of M of the N packets by the transceiver. M is an integer. The service request device discards the M of the N packets based on the control message. In other features, the one of the N packets is received from the service request device based on reception of an acknowledgement signal by the service request device from the first access point.

In yet other features, a network device is provided and includes transceiving means for transmitting N packets to a first access point and for receiving a control message from a second access point. The control message indicates reception of one of the N packets by the second access point from the first access point during a handover of the network device from the first access point to the second access point. N is an integer. Control means causes the transceiving means to refrain from transmitting the one of the N packets to the second access point based on the control message. The handover of the network device from the first access point to the second access point occurs prior to the control message being received by the transceiving means.

In still other features, the transceiving means transmits the one of the N packets to the second access point prior to the control message being received by the transceiving means. The control message indicates reception of a redundant packet by the second access point based on reception of the one of the N packets by the second access point.

In other features, the N packets include a first packet and a second packet. The control message indicates reception of one of the first packet and the second packet by the first access point. The control means causes the transceiving means to refrain from transmitting the other one of the first packet and the second packet to the second access point based on the control message.

In yet other features, the first access point receives the one of the N packets in a first radio access network and the second access point receives the one of the N packets in a second radio access network. In other features, the control message is at least one of initially generated within a packet data convergence protocol layer of the second access point and initially generated as a packet data convergence protocol layer control packet data unit.

In other features, the transceiving means transmits a first set of service data units to the first access point. The first set of service data units includes the N packets. The transceiving means transmits a second set of service data units to the second access point. The second set of service data units including the one of the N packets.

In still other features, the transceiving means receives the control message prior to transmitting the one of the N packets to the second access point. In other features, the transceiving means receives the control message prior to transmitting the N packets to the second access point. The control means causes the transceiving means to refrain from transmitting the N packets to the second access point based on the control message.

In other features, the control message indicates reception of M of the N packets. M is an integer. The control means causes the transceiving means to refrain from transmitting the M of the N packets to the second access point.

In other features, the transceiving means transmits the one of the N packets to the second access point based on reception of an acknowledgement signal from the first access point. In other features, the transceiving means discards at least one of the N packets after a predetermined period. In other features, the transceiving means transmits the one of the N packets to the second access point based on expiration of a predetermined time period.

In other features, a target access point is provided and includes transceiving means for receiving one of N packets associated with a service request device. The one of the N packets is received by the transceiving means from a first access point during a handover of the service request device from the first access point to the target access point. The N packets are transmitted from the service request device to the first access point and N is an integer. Control means for generating a control message. The control message indicates reception of the one of the N packets by the transceiving means. The transceiving means transmits the control message to the service request device to prevent the service request device from transmitting the one of the N packets to the target access point.

In other features, the service request device transmits the N packets to the first access point prior to the handover of the service request device from the first access point to the target access point. In still other features, the transceiving means receives the one of the N packets from the service request device prior to the control message being transmitted by the transceiving means. The control message indicates reception of a redundant packet by the transceiving means based on the reception of the one of the N packets from the service request device.

In other features, the N packets include a first packet and a second packet. The control message indicates reception of one of the first packet and the second packet by the first access point. The control means causes the transceiving means to transmit the control message to the service request device. This prevents the service request device from transmitting the other one of the first packet and the second packet to the transceiving means based on the control message.

In other features, the first access point receives the one of the N packets in a first radio access network and the transceiving means receives the one of the N packets in a second radio access network. In yet other features, the control message is at least one of initially generated within a packet data convergence protocol layer of the transceiving means and initially generated as a packet data convergence protocol layer control packet data unit.

In other features, the control message indicates reception of M of the N packets by the transceiving means. M is an integer. The service request device discards the M of the N packets based on the control message. In other features, the transceiving means receives the one of the N packets from the service request device based on reception of an acknowledgement signal by the service request device from the first access point.

In still other features, the systems and methods described above are implemented by a computer program including instructions that are executable by one or more processors. The computer program can reside (or be tangibly stored) on a computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 10C is a functional block diagram of a mobile device.

DETAILED DESCRIPTION

Figure 1:
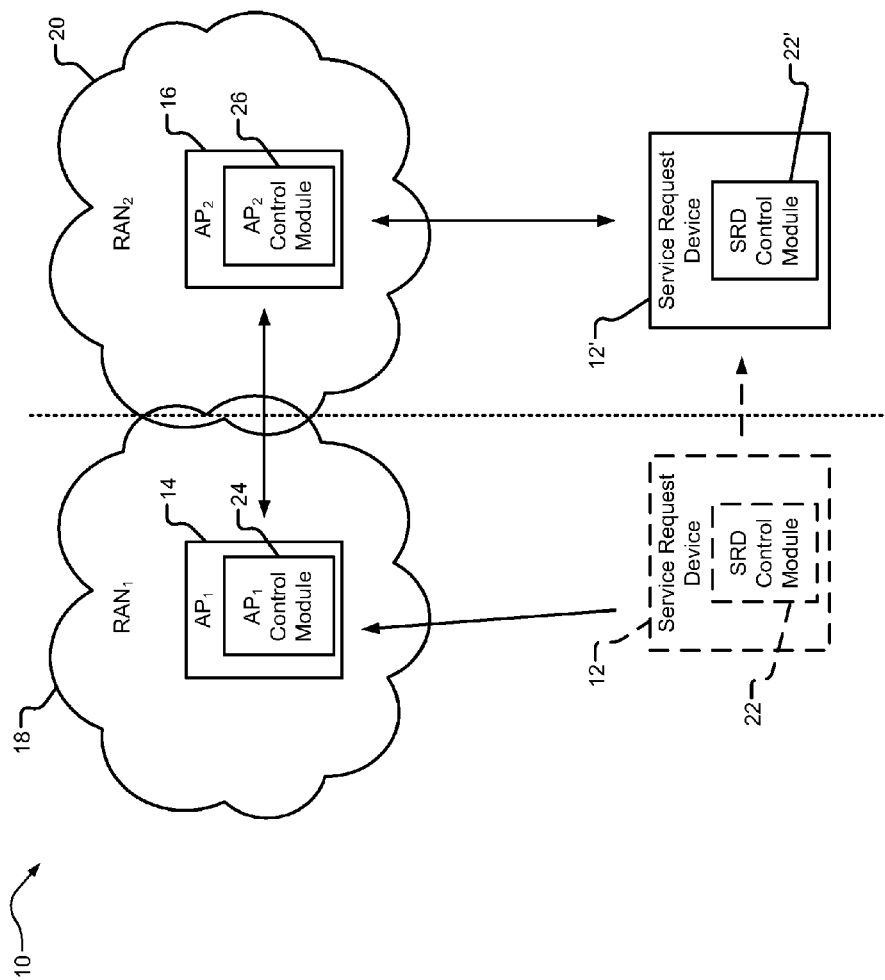
FIG. 1 is a functional block diagram illustrating a handover in an exemplary network system in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In the following description, a service request device (SRD) may refer to user equipment (UE) and/or a mobile node. A service request device may include equipment of an end user, such as a processor, a radio interface adaptor, etc. A service request device may include a mobile network device, a personal data assistant (PDA), a computer, etc.

Also, in the following description, the term mobility protocol may include a local mobility protocol and/or a global mobility protocol. A local mobility protocol may refer to a communication protocol used for mobility by a service request device between access points of a network, such as a public land mobile network (PLMN). The access points are in communication with different access routers. A global mobility protocol refers to a communication protocol used for mobility by a service request device between access points of different networks. The different networks may be different PLMNs.

A mobility protocol may include a mobile Internet protocol (MIP), which may refer to a host-based Internet protocol (IP) or a network-based IP. Internet Engineering Task Force (IETF) RFC 3344 and IETF RFC 3775 are incorporated herein by reference in their entirety. A host-based IP may include a client mobile IP (CMIP), such as CMIPv4 and CMIPv6, or a dual stack mobile IP (DSMIP). A host-based IP is used when mobility management is handled by a service request device. A network-based IP may include a proxy MIP (PMIP), such as PMIPv4 and PMIPv6. A network-based IP may be used, for example, when mobility management is handled by a mobility management entity (MME) or other network device on behalf of a service request device.

In addition, in the following description various networks and network devices are disclosed. Although a particular number of each network device is shown, any number of each network device may be included. For example, in a home network and/or a visited network, any number of wireless access gateways (WAGs), home subscriber servers (HSSs), authentication authorization and accounting (AAA) servers, and so on may be included. Selection of one of each of the devices may be performed during communication with a service request device. Each of the network devices may be considered a remote network device relative to another network device.

The following network systems disclosed in FIGS. 1-5 and 7-9 may include 3GPP™ system networks and/or LTE network systems and comply with 3GPP™ system technical specifications, some of which are stated herein.

Referring now to FIG. 1, an exemplary network system 10 is shown. The network system 10 includes a service request device 12, a first access point 14 (first access point), and a second access point (target access point) 16. The first access point 14 is located in a first radio access network (RAN) 18 and the second access point 16 is located in a second RAN 20.

The service request device 12 may include a SRD control module 22, which may request various real-time and non-real-time services, such as Web browsing, voice over Internet phone (VoIP), electronic mail (email), file transfer protocol (ftp) applications, and real-time IP multimedia, as well as conversational and streaming services. The real-time and non-real-time services may be provided by the first and second RANs. The service request device 12 is shown as accessing the first access point 14 (designated 12 with SRD control module 22) and as accessing the second access point 16 (designated 12' with SRD control module 22').

The access points 14, 16 may each include an access point control module 24, 26. The access points 14, 16, for example, may be base stations, such as evolved node B base stations (eNodeBs). The access points 14, 16 may include one or more home agents, such as routers. The access points 14, 16 may comply with one or more IEEE standards, such as 802.11, 802.11a, 802.11b, 802.11g, 802.11h, 802.11n, 802.16, and 802.20, which are incorporated herein by reference in their entirety.

The RANs 18, 20 may be cellular networks, LTE RANs, or other wireless access networks, some of which are disclosed below. The RANs 18, 20 may include 3GPP™ system networks, a visited public land mobile network (VPLMN), a home PLMN (HPLMN), etc. The RANs 18, 20 may comply with [1], [2], TS 22.278 "3GPP™ Service requirements for the evolved packet system (EPS)", TS 23.060 "General Packet Radio Service (GPRS) service description", which are incorporated herein by reference in their entirety.

During operation, the service request device 12 may move or roam between the RANs 18, 20 without losing connection. When the service request device 12 is at the out boundary or edge of the first RAN 18, a handover may be performed to maintain a predetermined quality of service level for the service request device 12. This handover may occur when communication between the first access point 14 and the service request device 12 begins to degrade, such as near the edge of the first RAN 18. For example, signals transmitted between the first access point 14 and the service request device 12 may decrease in quality, a signal-to-noise ratio of communication signals may decrease, transmitted packets may not be received or may be received with errors, etc.

During a handover, the first access point 14 in the first RAN 18 (first network) may transfer various information pertaining to the service request device 12 to the second access point 16 in the second RAN (target network). The information may include, for example, connection information and packet information. The connection information allows the service request device 12 to transfer between networks without losing a connection. The connection information may include protocol information, address information, Internet protocol (IP) information, gateway information, account information, etc. The packet information may indicate packets most recently received by the first RAN 18, status of a current message window, etc. The message window is associated with a current set of packets being transmitted.

When the service request device 12 switches between different networks, a host-based system or a network-based system may be used to establish a connectivity tunnel and/or a mobility tunnel. The connectivity tunnel may be a secured IP tunnel.

The host-based system may utilize CMIP or DSMIP protocols. CMIP versions 4 and 6 are described in IP mobility request for support memos RFC 3344 and in RFC 3775, which are incorporated herein by reference in their entirety. DSMIPv6 is described in "Mobile IPv6 support for dual stack, Hosts, and Routers (DSMIPv6)" of an Internet draft by the IPv6 working group of IETF, which is incorporated herein by reference in its entirety. The network-based system may utilize PMIP protocols. PMIP version 4 is described in an Internet-Draft titled "Mobility Management using Proxy Mobile IPv4" by Leung et al. and PMIPv6 is described in "Localized Mobility Management using Proxy Mobile IPv6" by Gundavelli, which are incorporated herein by reference in their entirety.

When a host-based protocol associated with version 4 networks, such as CMIPv4, is used, a serving gateway may function as a foreign agent (FA) and provide routing services to the service request device 12. This may occur when the service request device 12 is registered with a packet data network (PDN) gateway. The PDN gateway performs as a home agent. The service request device 12 may receive IP configuration information contained in an agent advertisement message through CMIPv4 or link layer protocols.

When a host-based protocol associated with a version 6 network, such as CMIPv6, is used, a serving gateway may function as an access router and provide routing services to the service request device 12. The PDN gateway performs as a home agent. The service request device 12 may receive IP configuration information contained in a CMIPv6 router advertisement message through CMIPv6 or link layer protocols.

When a network-based protocol is used, a serving gateway may function as a PMIP client (i.e., a PMIP agent (PMA)).

The PDN gateway performs as a PMIP home agent. A PMIP client allocates a SRD IP address and provides the SRD IP address to the service request device 12. The PMIP client performs PMIP mobility procedures.

In operation, packets are transmitted and received between the service request device 12 and the access points 14, 16. Acknowledgement (ACK) signals are transmitted upon successful reception of the packets. For example, when the service request device 12 transmits a packet to the first access point 14, the first access point 14 responds by sending an ACK signal to the service request device 12 to indicate that the packet was successfully received. The service request device 12 may then refrain from transmitting the packets to the access points 14, 16 and may discard the packets.

During a handover and due to deteriorated communication between the service request device 12 and the first access point 14, the service request device 12 may not receive an ACK signal from the first access point 14. This may occur when the first access point 14 successfully receives the transmitted packets. For this reason, the service request device 12 may retransmit all of the previously transmitted packets to the second access point 16. To prevent and/or minimize retransmission of the packets that have been successfully received, the second access point 16 generates a control message. The control message is transmitted to the service request device 12 and indicates which packets have been successfully received. The service request device 12 ceases transmission of packets that have already been successfully received by the second access point 16. This is described in further detail below.

Packets may be discarded for various reasons. Packets may be discarded after a predetermined period, after a certain number of transmission attempts, based on a connection with a target device, etc. Packets may be discarded after they have been successfully received or when they have been unsuccessfully transmitted and/or received. The discard techniques utilized by the service request device 12 apply to both real-time and non-real time applications.

The service request device 12 may perform a timer-based discard method and a message-based discard method. The timer-based discard method may refer to the discarding of packets after a predetermined period. For example, the service request device 12 generates and attempts to transmit packets to the access points 14, 16. If the access points 14, 16 do not respond with an ACK signal within the predetermined period, the service request device 12 may discard the packets. A first message-based discard method may include the generation of the control message, for example, by the second access point 16. The service request device 12 may discard the packets upon reception of the control message.

Another message-based technique includes the transmission of a discard signal (message), for example, by the service request device 12 to the second access point 16. The discard signal may indicate that the service request device 12 has transmitted certain packets to the second access point and that the packets are to be discarded. The message window signal may be generated regardless of whether the packets were received successfully. The discard signal may also include a request to adjust a message window.

Figure 2:
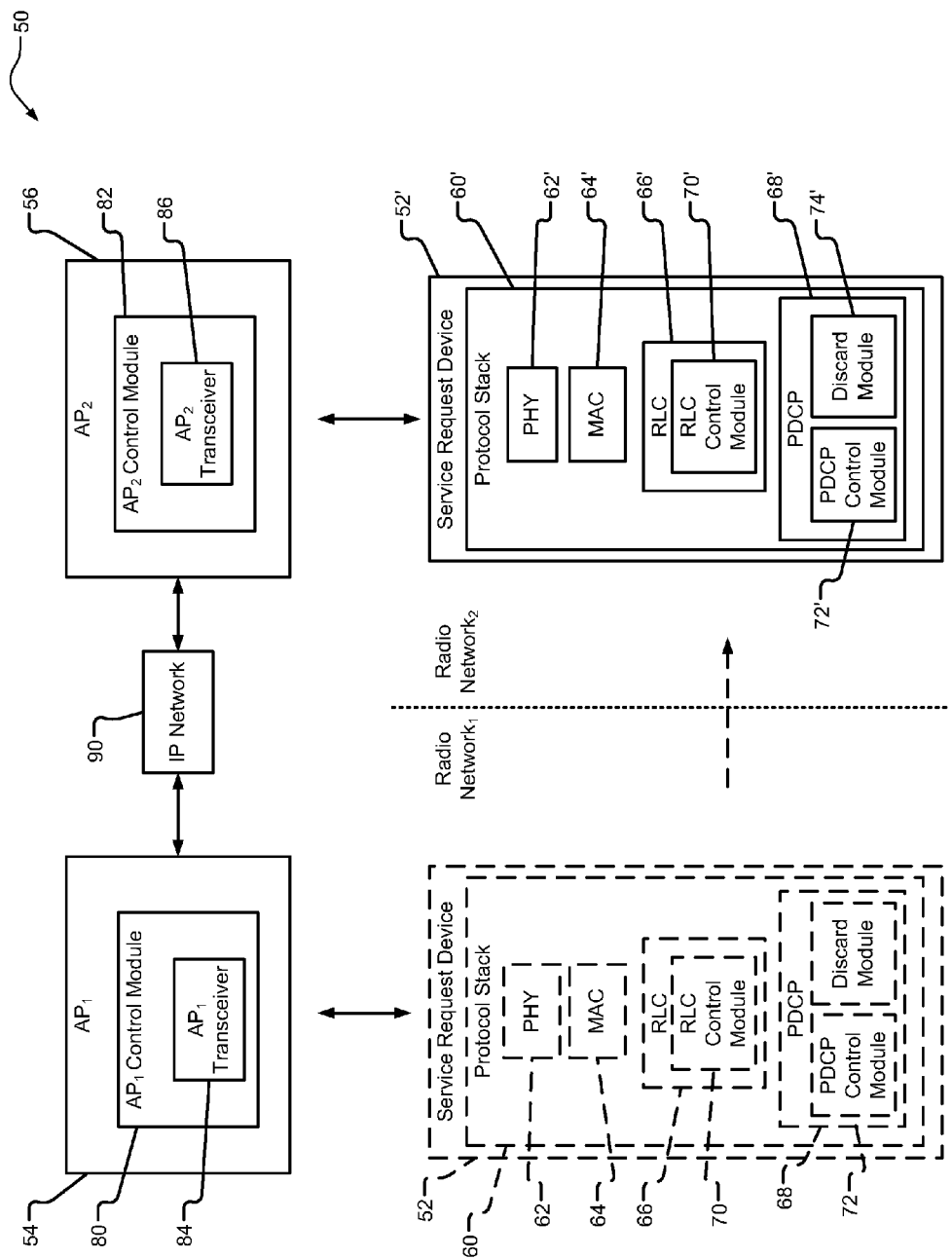
FIG. 2 is a functional block diagram illustrating a handover in another exemplary network system in accordance with an embodiment of the present disclosure.

Referring now to FIG. 2, another exemplary network system 50 is shown. The network system 50 includes a service request device 52, a first access point 54, and a second access point 56. The first access point 54 is located in a first RAN and the second access point 56 is located in a second RAN. The service request device 52 is shown as accessing the first access point 54 (designated 52 with devices 60-74) and as accessing the second access point 56 (designated 52' with devices 60'-74').

The service request device 52 includes a protocol stack 60 that includes a physical (PHY) layer 62, a medium access control (MAC) sub-layer 64, a radio link control (RLC) sub-layer 66, and a packet data convergence protocol (PDCP) sub-layer 68. The PHY layer 62 may be referred to as a L1 layer. The MAC and the RLC sub-layers 64, 66 are associated with a data link layer (L2) and the PDCP sub-layer 68 is associated with a network layer (L3). In general, the PDCP sub-layer 68 is considered an upper layer to the RLC sub-layer 66. The RLC sub-layer 66 is considered an upper layer to the MAC sub-layer 64. The MAC sub-layer 64 is considered an upper layer to the PHY layer 62. The functions of the PHY layer 62, the MAC sub-layer 64, the RLC sub-layer 66 and the PDCP sub-layer 68 may include functions described in, for example, the Radio Interface Protocol Architecture 3GPP TS 25.301, which is incorporated herein by reference in its entirety.

The PHY layer 62 provides information transfer services to the MAC sub-layer 64 and other upper layers. The PHY layer 62 provides macrodiversity distribution and combining and soft handover execution, error detection, encoding/decoding, multiplexing, frequency and time synchronization, RF processing, etc. The MAC sub-layer 64 provides data transfer including unacknowledged transfer of MAC SDUs. The MAC sub-layer 64 also provides reallocation of radio resources, changes of MAC parameters, mapping between logical channels and transport channels, selection of transport formats, priority handling, etc.

The RLC sub-layer 66 includes a RLC control module 70 and provides automatic repeat request (ARQ) functionality coupled with radio transmission. The RLC sub-layer 66 at the transmitting side retransmits a failed packet based on ARQ positive ACK signal or negative ACK (NACK) feedback signal from the RLC sub-layer 66 at the receiving side. The RLC sub-layer 66 has multiple operating modes including a transparent mode (TM), an unacknowledged mode (UM), and an acknowledged mode (AM). The RLC sub-layer 66 provides transparent data transfer of upper layer PDUs, unacknowledged data transfer of upper layer PDUs, and acknowledged data transfer of upper layer PDUs. The RLC sub-layer 66 provides segmentation and reassembly, concatenation, transfer of user data, flow control, sequence number checking, SDU discarding, etc.

Sequence number checking is used in unacknowledged mode (UM) and assures the integrity of reassembled SDUs. Sequence number checking also allows for the detection of corrupted RLC SDUs through checking sequence numbers in RLC PDUs when they are reassembled into a RLC SDU. RLC SDU discard is used to discharge a RLC SDU from a buffer. The RLC sub-layer 66 informs a higher layer of discarded packets, (i.e., discarded RLC SDU). This may occur if the RLC SDU is discarded at the RLC sub-layer 66 due to RLC re-establishment, a RLC reset, or an expiration of a timer in the RLC sub-layer 66. The RLC sub-layer also informs the higher layer of "unrecoverable error" if the RLC sub-layer in the transmitting side exhausts the maximum number of transmissions for the packet.

The PDCP sub-layer 68 includes a PDCP control module 72 and provides PDCP SDU delivery. The PDCP sub-layer 68 may provide header compression and decompression, transfer of user data, PDCP SDU discard, etc. PDCP SDU discard is used to discharge a PDCP SDU from a buffer. The PDCP sub-layer 68 may include one or more discard timer(s) 74. Each of the discard timer(s) 74 may be used in association with the transmission and successful reception of one or more packet(s). The PDCP sub-layer 68 may operate in timer-based and/or message-based modes, which correspond with the timer-based and message based techniques described herein.

Figure 3:
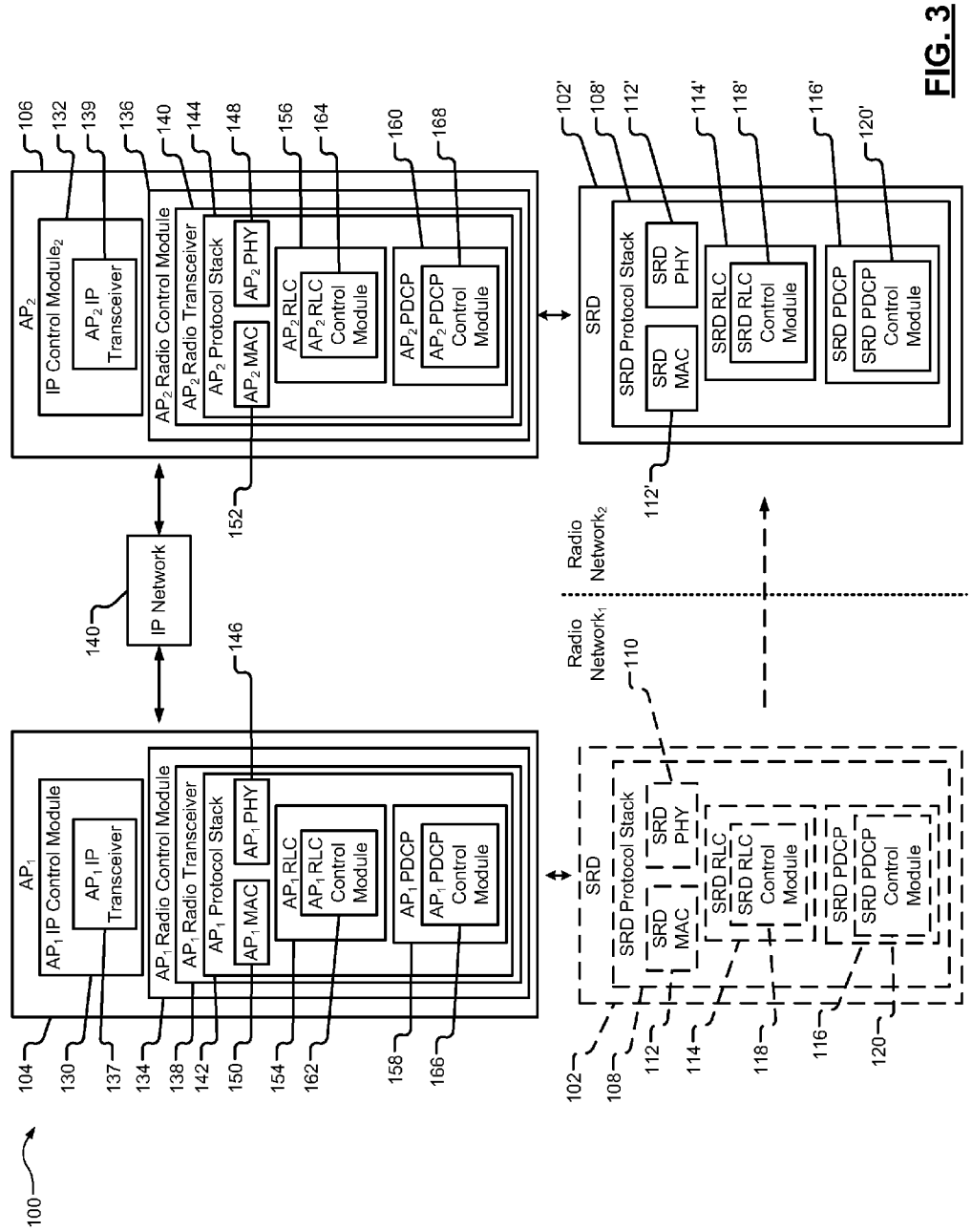
FIG. 3 is a functional block diagram illustrating a handover in another exemplary network system incorporating access points that each have multiple transceivers in accordance with an embodiment of the present disclosure.
Figure 4:
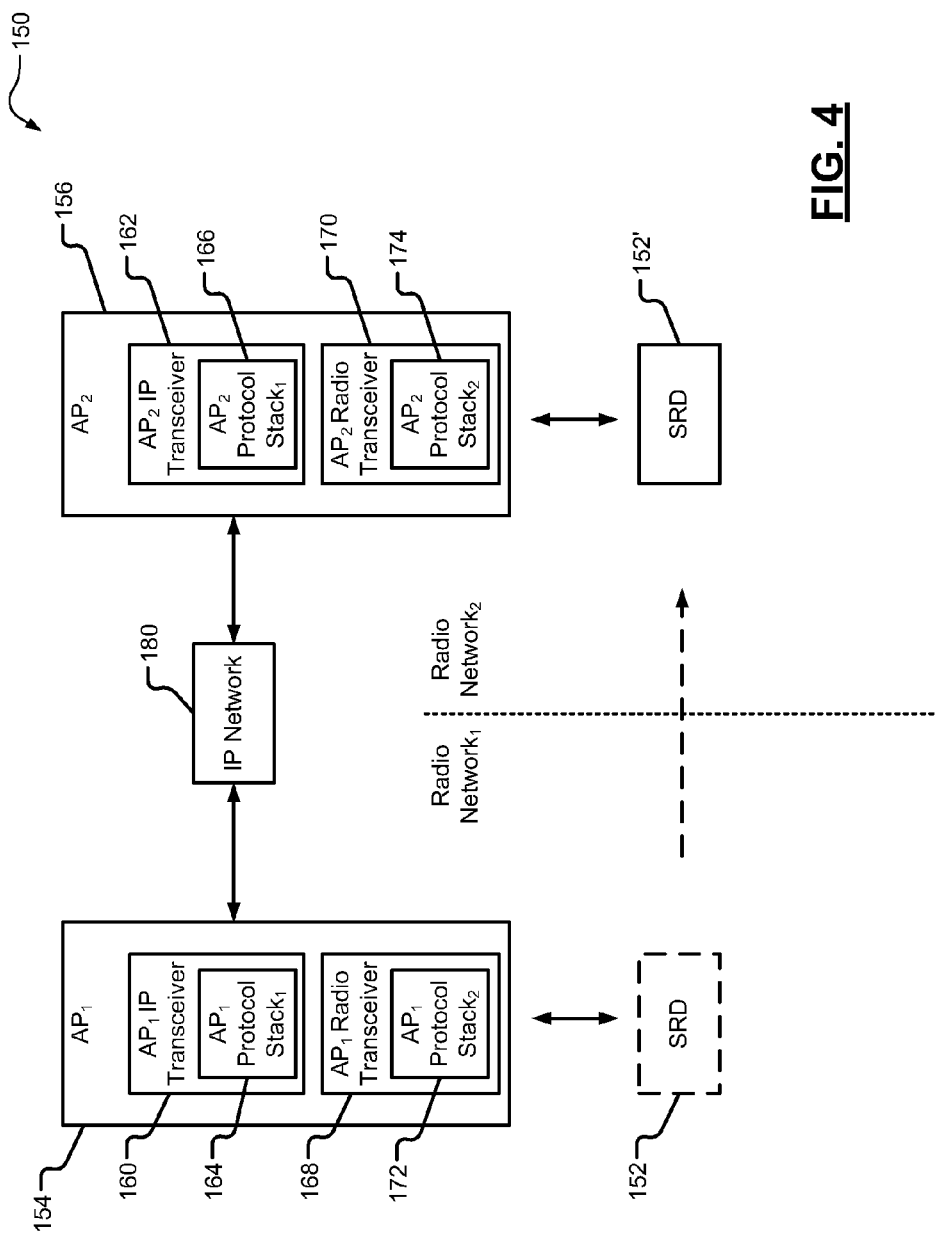
FIG. 4 is a functional block diagram illustrating a handover in another exemplary network system incorporating access points that each have multiple protocol stacks in accordance with an embodiment of the present disclosure.
Figure 5:
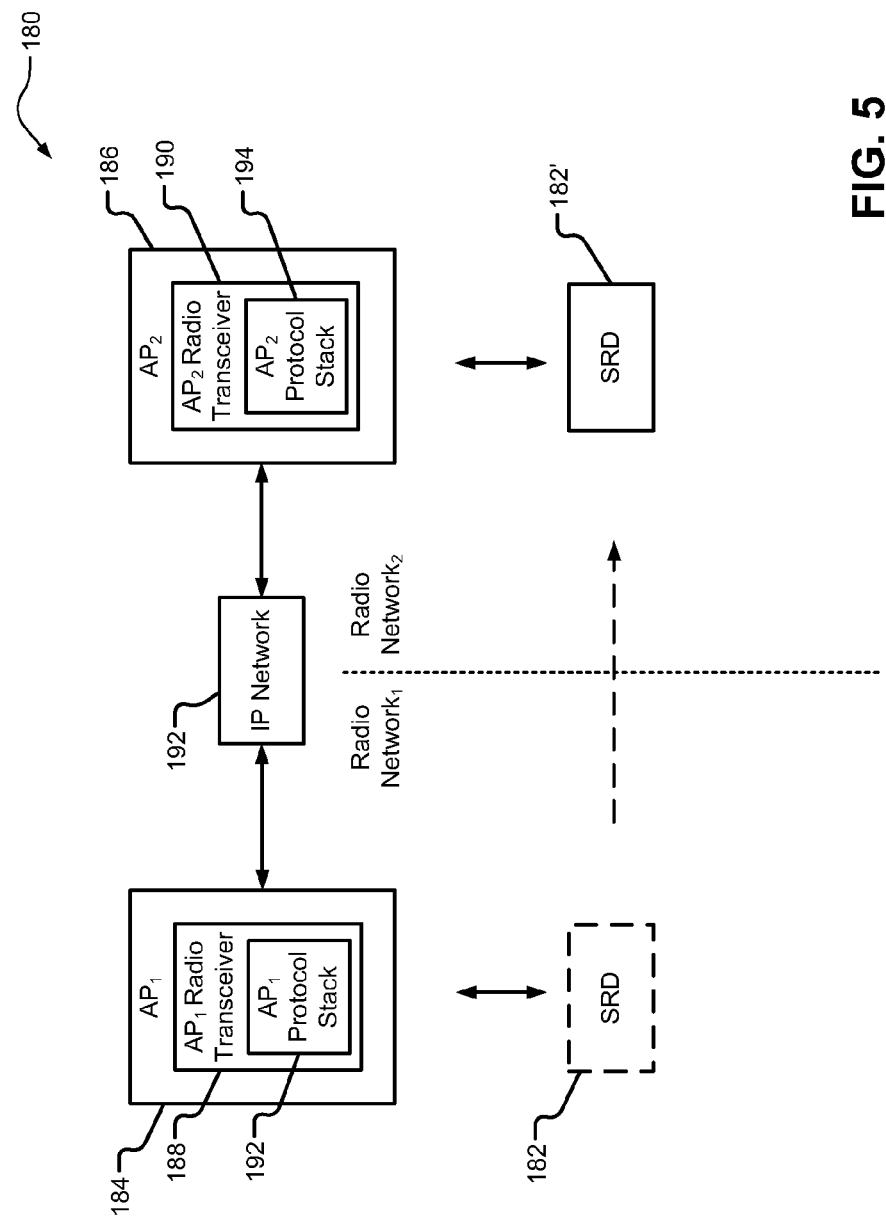
FIG. 5 is a functional block diagram illustrating a handover in another exemplary network system incorporating access points that each have a single transceiver in accordance with an embodiment of the present disclosure.

The first access point 54 and the second access point 56 include respective control modules 80, 82 with transceivers 84, 86. The transceivers 84, 86 are used to communicate with each other and with the service request device 52. When communicating with each other, the transceivers 84, 86 may communicate over an IP network 90. The transceivers 84, 86 may communicate using an asynchronous transfer mode (ATM), an orthogonal frequency-division multiplexing (OFDM) transfer mode, Internet protocols, etc. The communication between the transceivers 84, 86 may be wireless or wired. Each of the transceivers 84, 86 may include one or more protocol stacks, as shown in FIGS. 3-5. One of the protocol stacks may be used for wireless communication with the service request device 52.

Referring now to FIG. 3, another exemplary network system 100 is shown. The network system 100 includes a service request device 102, a first access point 104, and a second access point 106. The first access point 104 is located in a first RAN and the second access point 106 is located in a second RAN.

The service request device 102 includes a first protocol stack 108 that includes a SRD PHY layer 110, a SRD MAC sub-layer 112, a SRD RLC sub-layer 114, and a SRD PDCP sub-layer 116. The SRD RLC sub-layer 114 and the SRD PDCP sub-layer 116 respectively include a SRD RLC control module 118 and a SRD PDCP control module 120. The service request device 102 is shown as accessing the first access point 104 (designated 102 with devices 108-120) and as accessing the second access point 106 (designated 102' with devices 108'-120').

The access points 104, 106 include respective IP and radio control modules 130, 132, 134, 136. The IP control modules 130, 132 are used for communication between the access points 104, 106, which may be via an IP network 140. The IP control modules 130, 132 may communicate with each other via IP transceivers 137, 139 using wired or wireless communication techniques. The radio control modules 134, 136 include radio transceivers 138, 140 that are used for wireless communication with the service request device 102. The radio transceivers 138, 140 include protocol stacks 142, 144 that have PHY layers 146, 148, MAC sub-layers 150, 152, RLC sub-layers 154, 156, and PDCP sub-layers 158, 160. The RLC sub-layers 154, 156 and the PDCP sub-layers 158, 160 respectively include RLC control modules 162, 164 and PDCP control modules 166, 168. The IP transceivers may operate in an ATM or in an IP transfer mode. The protocol stacks operate in an OFDM transfer mode.

The layers 146-160 may have similar functions as and communicate with the layers 110-116. The second PDCP sub-layer 160 may generate control messages, which are transmitted to the service request device 102 for indication of packets received from the first AP 104 and/or the first PDCP sub-layer 158.

Referring now to FIG. 4, another exemplary network system 150 is shown. The network system 150 includes a service request device 152, a first access point 154, and a second access point 156. The first access point 154 is located in a first RAN and the second access point 156 is located in a second RAN. The service request device 152 is shown as accessing the first access point 154 (designated 152) and as accessing the second access point 156 (designated 152').

The first access point 154 and the second access point 156 respectively include IP transceivers 160, 162 with first protocol stacks 164, 166 and radio transceivers 168, 170 with second protocol stacks 172, 174. The first protocol stacks 164, 166 are used for communication with each other, which may be via an IP network 180. The second protocol stacks 172, 174 are used for communication with the service request device 152. The first protocol stacks 164, 166 may be different than and/or include different layers than the second protocol stacks 172, 174.

Referring now to FIG. 5, another exemplary network system 180 is shown. The network system 180 includes a service request device 182, a first access point 184, and a second access point 186. The first access point 184 is located in a first RAN and the second access point 186 is located in a second RAN. The service request device 182 is shown as accessing the first access point 184 (designated 182) and as accessing the second access point 186 (designated 182').

The first access point 184 and the second access point 186 include respective transceivers 188, 190 with protocol stacks 192, 194. The protocol stacks 192, 194 are used for communication between the access points 184, 186 and for communication with the service request device 182. The communication between the access points 184, 186 is wireless and may be via an IP network 192. The communication between the access points 184, 186 may not be via the IP network 192. For example, the first access point 184 may communicate directly with the second access point 186, via a gateway, or via an intermediate communication node.

Figure 6A:
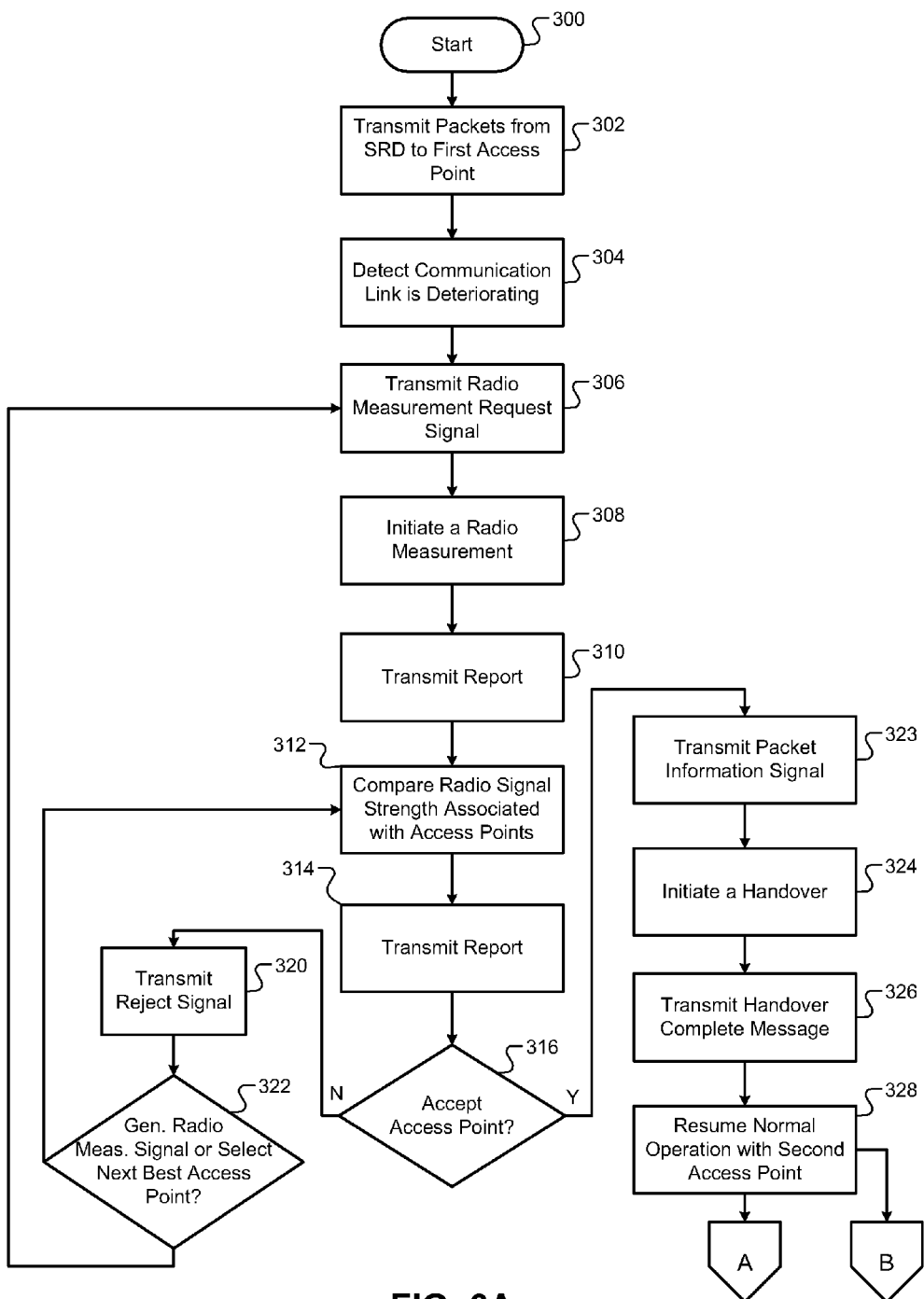
FIGS. 6A and 6B illustrate a method of operating a network system during a handover in accordance with an embodiment of the present disclosure.
Figure 6B:
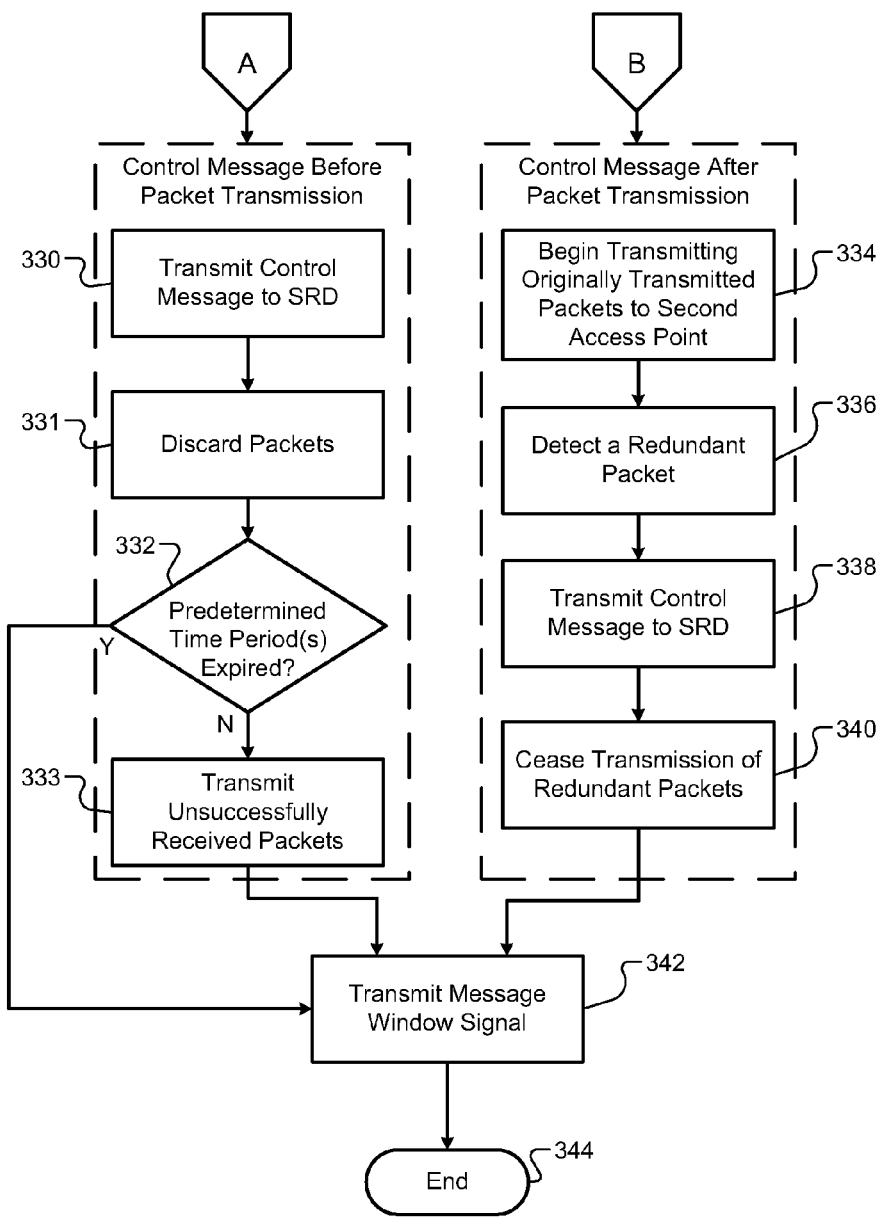

Referring now to FIGS. 6A-B, a method of operating a network system during a handover is shown. The method may be applied to the network systems disclosed herein including the network systems of FIGS. 1-5 and 7-9. The method may begin at step 300.

In step 302, a first access point communicates with a service request device. The service request device transmits packets (originally transmitted packets) to the first access point. For example, the service request device may transmit to the first access point packets $X_1$-$X_4$.

In step 304, the first access point detects that a communication link or signal between the first access point and the service request device is deteriorating. In step 306, the first access point transmits a radio measurement request signal to the service request device.

In step 308, the service request device initiates a radio measurement based on the radio measurement request. The service request device may detect neighboring access points of the first access point. The service request device measures the radio strength of the neighboring access points. For example, the service request device detects and measures the radio signal strength from a second access point. The signal strengths may be stored.

In step 310, the service request device transmits a report to the first access point indicating the radio signal strength of the second access point. In step 312, the first access point receives the report and determines that the radio signal strength for the service request device with the second access point is better (or stronger) than the radio signal strength with the first access point.

In step 314, the first access point transmits a handover request signal to the second access point. The handover request includes information pertaining to the service request device to allow the second access point to determine if the second access point can support the service request device. The handover request information may include protocol information, network information, subscriber information, etc.

In step 316, the second access point determines whether to accept the service request device based on the handover request information. When the second access point accepts the service request device, step 317 is performed, otherwise step 320 is performed.

In step 317, the second access point may transmit an accept signal to the first access point that indicates acceptance of the service request device. In step 318, the first access point transmits a handover command message to the service request device. The handover command message instructs the service request device to handover to the second access point. The handover command message may include information that allows the service request device to do the handover, such as protocol information, network information, access point information, etc.

In step 320, the second access point may transmit a reject signal indicating that the second access point does not accept the service request device. In step 322, control of the first access point determines whether to generate another radio measurement request or to select the next best access point based on the report of step 310. When another radio measurement request is to be generated, control of the first access point returns to step 306. When another access point (updated access point) is to be selected control of the first access point returns to step 312 based on the report of step 310. Steps 312-316 may be repeated based on the updated access point rather than the second access point.

In step 323, the first access point and/or the PDCP layer of the first access point may generate a packet information signal, which may be transmitted to the PDCP layer of the second access point (or updated access point). The packet information signal indicates to the second access point which packets have been received by the first access point from the service request device. The packet information signal may identify the packets, include the packets, and/or include a message window that is associated with the packets.

For example, when the service request device transmits the packets $X_1$-$X_4$ to the first access point, the first access point may successfully receive packets $X_2$ and $X_4$. The first access point provides packets $X_2$ and $X_4$ to the second access point. The number of packets and the size of the message window may vary per application. The message window provides the second access point with a point of reference as to which packets are to be transmitted to the second access point by the service request device. The message window may provide a starting sequence number and an ending sequence number, which identify first and last packets.

Step 323 may be performed earlier or later on in this disclosed method. For example, step 323 may be performed before step 322 or after step 324. The performance of step 323 before or during steps 324-328 allows the first access point to transmit the packet information signal to the second access point during the handover between the service request device and the second access point. This allows the second access point to be updated with respect to transmitted and received packets and to be ready for communication with the service request device at the end of step 328. Also, as the second access point is updated with the packet information, the second access point may generate and transmit a control message to the service request device, as performed in steps 330 and 334.

In step 324, the service request device receives the handover command message and initiates a handover to the second access point. In step 326, the service request device acquires the second access point and successfully completes the handover. The service request device transmits to the second access point a handover complete message.

In step 328, normal operation, i.e., packet transmission and reception for the service request device resumes with the second access point instead of the first access point. This operation may be altered based on the reception of control messages from the second access point.

As a first option, steps 330-333 may be performed. As a second option steps 334-340 may be performed. The first and second options may be selected based on the capability of the second access point, how quick the second access point is in transmitting a control message, and/or how proactive the second access point is in preventing transmission of redundant packets. A second access point may perform the first and/or second options.

In step 330, the second access point may generate and transmit a control message to the service request device. The control message may be generated by a PDCP layer of the service request device and may be referred to as a PDCP control packet data unit (PDU). The control message indicates to the service request device which packets have been successfully received. Before step 330 the service request device may not have knowledge of packets successfully received by the first access point due to not receiving an acknowledgement (ACK) signal from the first access point. Continuing from the above example, the control message may indicate that the packets $X_2$ and $X_4$ were successfully received and/or indicate that the packets $X_1$ and $X_3$ were not successfully received. Step 330 may be performed before the service request device transmits any redundant packets to the second access point.

In step 331, the packets that have been received may be discarded by the service request device. The packets may be discarded in step 331 or in step 342, as described below. In step 332, the service request device determines whether one or more predetermined period(s) are expired with respect to the originally transmitted packets. For example, the service request device determines whether predetermined period(s) are expired for packets $X_1$-$X_4$. When the predetermined period(s) are expired, the service request device proceeds to step 342 to adjust a message window and discard one or more of the packets $X_1$-$X_4$. When the predetermined period(s) are not expired, the service request device may proceed to step 333. In step 333, the service request device may transmit the unsuccessfully received packets, for example, packets $X_1$ and $X_3$ to the second access point.

In step 334, the service request device begins transmitting the originally transmitted packets to the second access point. The originally transmitted packets may be transmitted before the reception of a control message from the second access point. For example, the service request device may begin to transmit packets $X_1$-$X_4$ to the second access point. The packets may be transmitted sequentially.

In step 336, the second access point detects a redundant packet. For example, the second access point may detect a redundant packet when the packet $X_2$ is received. This is due to the reception of the packet $X_2$ from the first access point and from the service request device by the second access point.

In step 338, the second access point may generate and transmit the control message to the service request device. The control message may be generated by a PDCP layer of the service request device and may be referred to as a PDCP control PDU. The control message acknowledges received packets. The control message indicates to the service request device the packets that have been successfully received by the second access point. The control message may be generated and transmitted after reception of the first redundant packet and before the reception of one or more other redundant packets. This minimizes the number of redundant packets transmitted, improves packet transmission efficiency, radio resource usage, and minimizes the use of system resources for the transmission of redundant packets.

In step 340, the service request device ceases to transmit redundant packets based on the control message. The service request device may receive the control message and cease transmission of redundant packets before transmission of all of the originally transmitted packets. The packets that have been received may be discarded by the service request device. The packets may be discarded in step 340 or in step 342, as described below.

In step 342, the service request device may generate and transmit a message window signal to the second access point. The message window signal may indicate to the second access point that the service request device has attempted to transmit certain packets to the second access point and that the service request device is now going to discard these packets. The packets may be discarded regardless of whether the packets have been successfully received by the second access point. The packets, such as RLC service data units (SDUs) or PDCP SDUs, may be discarded from the RLC or PDCP layers of the service request device. The second access point may also discard corresponding packets to the discarded packets of the service request device.

The message window signal and any response signals generated based on the message window signal allow the service request device and the second access point to agree on a sequence number upon which to begin transmission of additional packets. When the packets to be discarded are in the RLC layer and/or assigned to a sequence number, a RLC discard technique may be used, such as a move receiving window (MRW) technique. An example MRW technique for a universal mobile telecommunication system (UMTS) is described in Radio Link Control Protocol Specification 3GPP TS 25.322 and in European telecommunication standards institute (ETSI) TS 125 322, which are incorporated herein by reference in their entirety. Control may end at 344.

The above-described steps in the above-described Figures are meant to be illustrative examples; the steps may be performed sequentially, synchronously, simultaneously, continuously, during overlapping time periods or in a different order depending upon the application.

Figure 7:
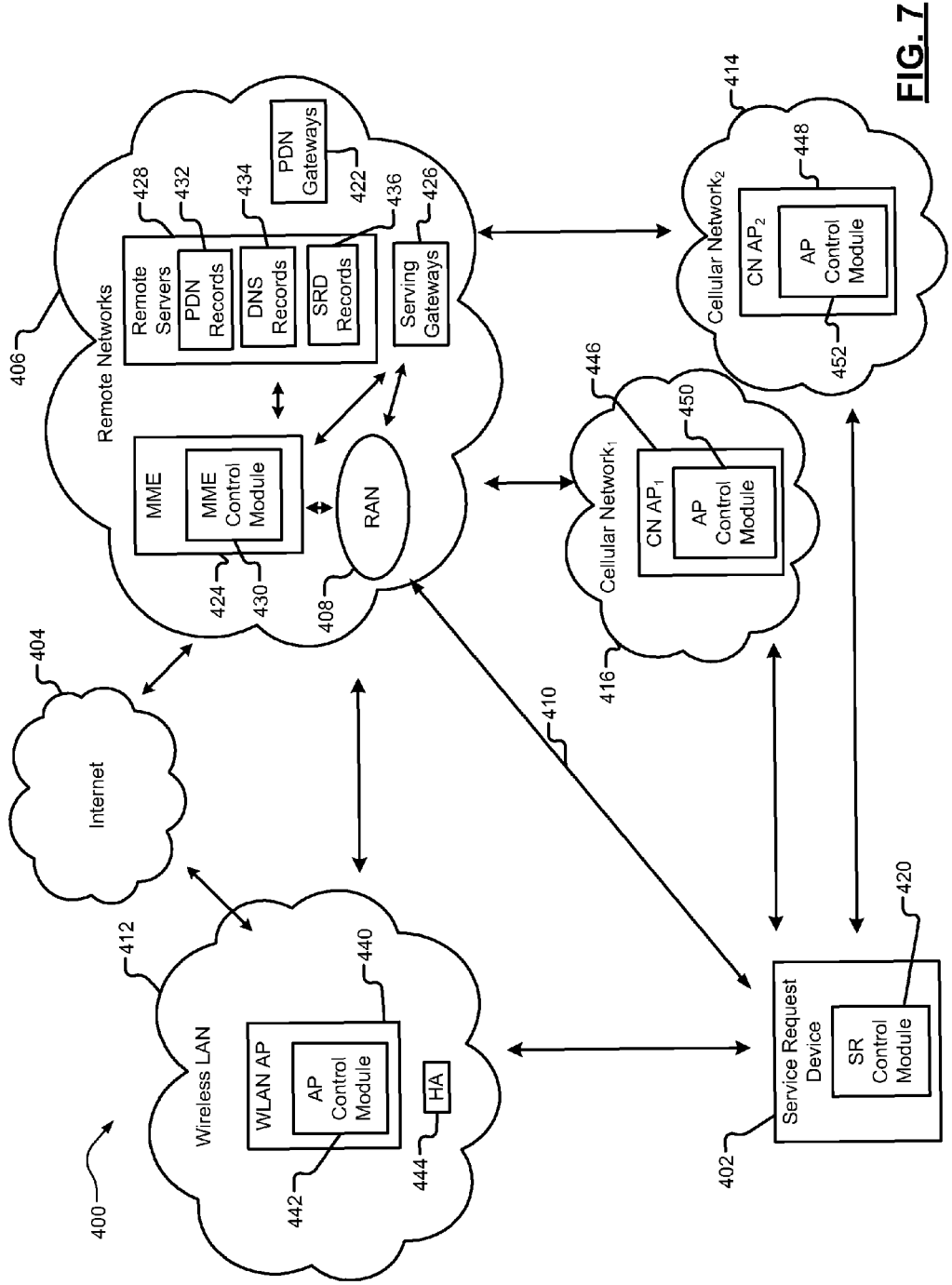
FIG. 7 is a functional block diagram of an exemplary network system in accordance with an embodiment of the present disclosure.
Figure 8:
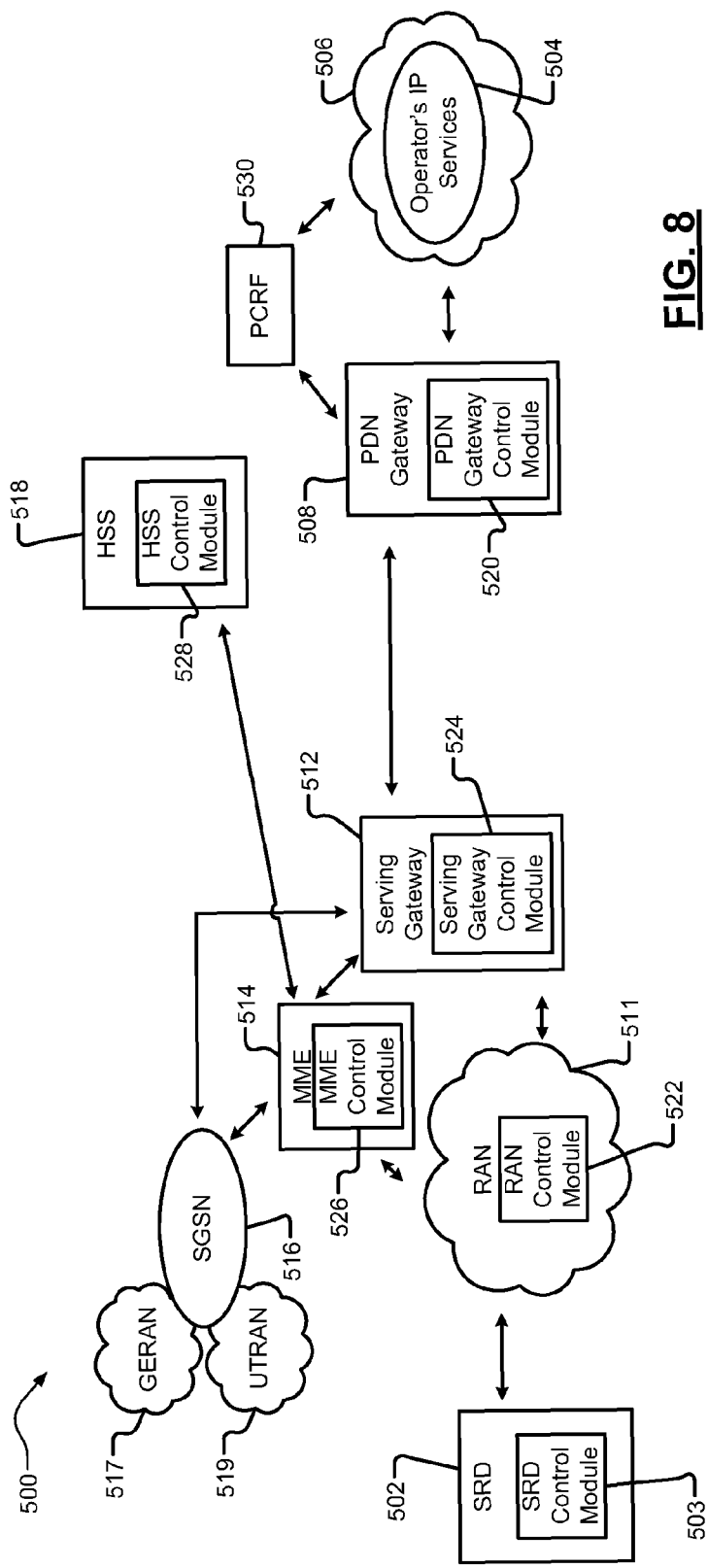
FIG. 8 is a functional block diagram of an exemplary network system illustrating non-roaming access via a radio access network in accordance with an embodiment of the present disclosure.
Figure 9:
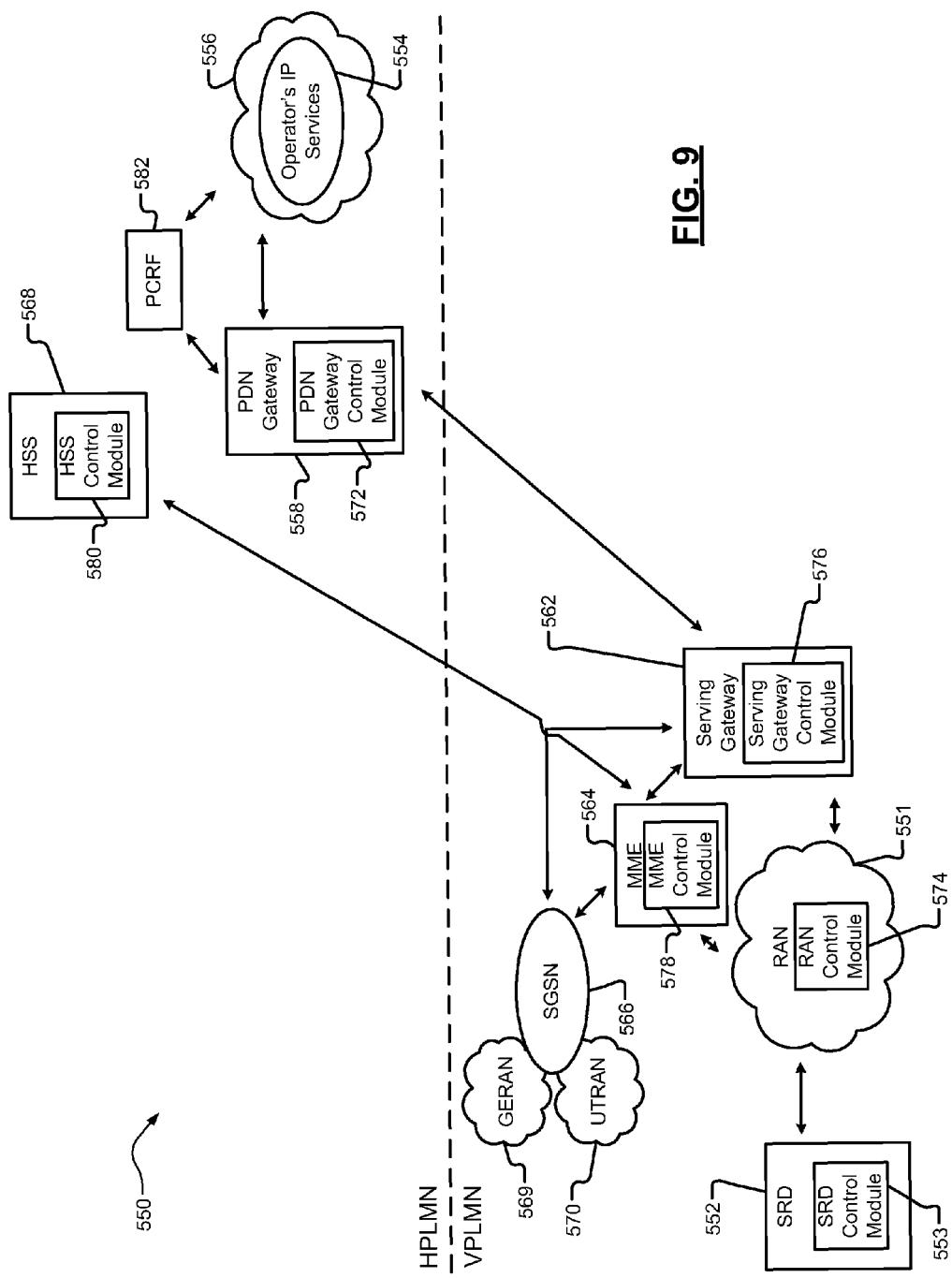
FIG. 9 is a functional block diagram of an exemplary network system illustrating roaming access via a radio access network in accordance with an embodiment of the present disclosure.

The following FIGS. 7-9 provide additional example network systems in which the embodiments of the present application may be applied.

Referring now to FIG. 7, an exemplary network system 400 is shown. The network system 400 includes a service request device 402 that may communicate with the Internet 404 and/or one or more remote networks 406. The service request device 402 may communicate with a radio access network (RAN) 408, such as an evolved universal terrestrial radio access network (EUTRAN) of the remote networks 406 as indicated by signal line 410 or may communicate with the remote networks 406 via an access network. Some examples of an access network are a wireless local area network (WLAN) 412, a first cellular network 414, and a second cellular network 416. The access points of the networks 412-416 may perform handovers with respect to the service request device 402 and generate radio measurement, handover requests, handover responses, handover command messages, control messages, PDCP control PDUs, etc., as described above.

The network system 400 provides connectivity and/or mobility management. The connectivity management is provided in an efficient manner using one or more of the techniques described herein. Mobility management allows the service request device 402 to move between local and/or global networks. The mobility may be provided through establishment of Internet protocol (IP) connectivity between the service request device 402 and the remote networks 406.

The service request device 402 includes a service request control module 420 that provides connectivity protocol information to the remote networks 406. The service request control module 420 may identify a packet data network (PDN) gateway, such as one of the PDN gateways 422, of the remote networks 406 to provide requested services. The service request device 402 accesses packet switched domain services via the selected PDN gateway. The PDN gateway may be located in a home PLMN (HPLMN). The service request device 402 may request various real-time and non-real-time services, such as Web browsing, voice over Internet phone (VoIP), electronic mail (email), and real-time IP multimedia, as well as conversational and streaming services.

The remote networks 406 may include 3GPP™ system networks, a VPLMN, a HPLMN, etc. The remote networks 406 may comply with [1], [2], TS 22.278 "3GPP™ Service requirements for the evolved packet system (EPS)", TS 23.060 "General Packet Radio Service (GPRS) service description", which are incorporated herein by reference in their entirety. The remote networks 406 may include the RAN 408, the PDN gateways 422, a MME 424, serving gateways 426, and remote servers 428, such as home subscriber servers (HSSs). The MME 424 may include a MME control module 430 that supports connectivity and/or mobility of the service request device 402. The serving gateways 426 may include system architecture evolution (SAE) gateways.

The remote servers 428 may include PDN records 432, DNS records 434, and SRD records 436. The PDN records 432 include information regarding the services, connectivity protocols, and mobility protocols supported by the PDN gateways 422. The DNS records 434 include information regarding the services and connectivity protocols supported by packet data gateways (PDGs). The DNS records 434 may also include mobility protocols supported by the PDGs. The SRD records 436 include information regarding the subscriber and account associated with the service request device 402.

Each of the PDN gateways 422 may have a physical address (effective address) and/or one or more logical addresses, which are referred to as remote IP addresses. Each remote IP address may have an associated service and connectivity and mobility protocol and be assigned to the service request device 402. For example only, a remote IP address may be associated with home-based IP CMIPv6 and be used to provide VoIP service to the service request device 402.

When the service request device 402 initially accesses the network system 400, the MME 424, the PDN gateways 422, the serving gateways 426, and the remote servers 428 are unaware of the SRD preferred PDN, PDN gateway, and IP services. The MME 424, the PDN gateways 413, the serving gateways 426 and the remote servers 428 may support multiple connectivity protocols and services. The embodiments described herein include the service request device 402 providing PDN, PDN gateway and IP services information early on in an attachment process. This improves network performance and quickly provides the services desired by the service request device.

The WLAN 412 includes a WLAN access point (AP) 440 with an AP control module 442. The WLAN AP 440, for example, may be a base station, such as an evolved node B base station (eNodeB). The WLAN 440 may also include one or more home agents 444, such as routers. The AP mobility control module 442 facilitates authentication of the service request device 402 and the transfer of connectivity protocol information, mobility protocol information, PDN information, PDN gateway information, and IP services information between the service request device 402 and network devices of the remote networks. The WLAN 22 may comply with one or more IEEE standards 802.11, 802.11a, 802.11b, 802.11g, 802.11h, 802.11n, 802.16, and 802.20, which are incorporated herein by reference in their entirety.

The cellular networks 414, 416 may include a first cellular network AP 446 and a second network AP 448 with respective AP control modules 450, 452, as shown. The AP control modules 446, 448 may also facilitate authentication of the service request device 402 and the transfer of connectivity and mobility protocol information, and PDN gateway information between the service request device 402 and network devices of the remote networks 406.

During operation, the service request device 402 may move or roam between the networks 412, 414, 416 without losing connection to one or more of the remote networks 406. When in communication with the RAN 408, IP traffic flows between the RAN 408 and the serving gateways 426. When in communication with the networks 412, 414, 416, IP traffic flows between the networks 412, 414, 416 and the serving gateways 426.

When the service request device 402 accesses the remote networks 406 while roaming between the networks 412, 414, 416, connectivity and mobility tunnels, may be used to manage and maintain connectivity and mobility of the service request device 402. When the service request device 402 switches between different networks, a host-based system or a network-based system may be used to establish a connectivity tunnel and/or a mobility tunnel. The connectivity tunnel may be a secured IP tunnel.

Referring now to FIG. 8, another exemplary network system illustrating non-roaming access via a radio access network 501, such as a 3GPP™ network, is shown. The network system 500 includes a service request device 502 with an SRD control module 503 that obtains network access to receive services, such as operator IP services 504, from a PDN 106. The service request device 502 establishes Internet protocol (IP) connectivity with a PDN gateway 508 to receive the services 504. The services 504 may include real-time and non-real-time services, such as Web browsing, voice over Internet phone (VoIP), electronic mail (email), and IP multimedia subsystem (IMS) services, packet switched service sequence (PSS) services, conversational and streaming services, etc. The access points of the radio access networks of the network system may perform handovers with respect to the service request device 502 and generate radio measurement, handover requests, handover responses, handover command messages, control messages, PDCP control PDUs, etc., as described above.

The network system 500 may include the PDN gateway 508, an evolved universal terrestrial radio access network (EUTRAN) 510, a serving gateway 512, a mobility management entity (MME) 514, a servicing general packet radio service support node (SGSN) 516, and a home subscriber server (HSS) 518. The SGSN 516 may be in communication with a GSM EDGE RAN (GERAN) 517 and/or a universal terrestrial RAN (UTRAN) 519. The UTRAN 519 may be the same as the EUTRAN 510 or may be another RAN. The PDN gateway 508, the EUTRAN 510, the serving gateway 512, the MME 514, and the home subscriber server 518 respectively include a PDN gateway control module 520, a EUTRAN control module 522, a serving gateway control module 524, a MME control module 526, and a HSS control module 528.

The PDN gateway 508 is in communication with a policy and changing rules function (PCRF) entity 530 and the PDN 506. The PCRF entity 530 may be used to terminate reference points between network devices, such as reference points associated with the serving gateway 512 and the PCRF entity 530. Reference points refer to communication links between network devices.

The serving gateway 512 may be a SAE gateway or a wireless access gateway (WAG). The MME 514 is in communication with each of the EUTRAN 510, the serving gateway 512, the SGSN 116, and the HSS 518. The MME 514 performs SRD tracking and security functions. The serving gateway 512 is in communication with the PDN gateway 508, the EUTRAN 510, and the SGSN 516. The SGSN 516 may perform MME selection and/or serving gateway selection.

The HSS 518 may have authentication and subscriber profile information, such as for a subscriber of the service request device 502, to access the PDN 506. The HSS 518, the MME 514, and/or the serving gateway 524 may perform PDN, PDN gateway, and IP services selections. The selections may be based on PDN, PDN gateway, and IP service information provided by the service request device 502. For example only, the HSS 518 may authenticate the subscriber after an invoked tunnel establishment request by the service request device 102.

Referring now to FIG. 9, another exemplary network system 550 illustrating roaming access via a radio access network 551 is shown. The network system 150 includes a service request device 552 with an SRD control module 553 that obtains network access to receive services, such as operator IP services 554, from a PDN 556. The PDN 556 may be part of a HPLMN, whereas the service request device 552 is located in a VPLMN. The service request device 552 establishes IP connectivity with a PDN gateway 558 to receive the services 554. The access points of the radio access networks of the network system 550 may perform handovers with respect to the service request device 502 and generate radio measurement, handover requests, handover responses, handover command messages, control messages, PDCP control PDUs, etc., as described above.

The network system 550 may include the RAN 551, the PDN gateway 558, a serving gateway 562, a MME 564, a SGSN 566, and a HSS 568. The SGSN 566 may be in communication with a GERAN 569 and/or an UTRAN 570. The UTRAN 570 may be the same as the RAN 551 or may be another RAN. The PDN gateway 558, the RAN 551, the serving gateway 562, the MME 564, and the home subscriber server 568 respectively include a PDN gateway control module 572, a EUTRAN control module 574, a serving gateway control module 576, a MME control module 578, and a HSS control module 580.

The PDN gateway 558 is in communication with a PCRF entity 582 and the PDN 556. The PCRF entity 582 may be used to terminate reference points between network devices, such as reference points associated with the serving gateway 562 and the PCRF entity 582.

The serving gateway 562 may be a SAE gateway or a wireless access gateway (WAG). The MME 564 is in communication with each of the RAN 551, the serving gateway 562, the SGSN 566, and the HSS 568. The MME 564 performs SRD tracking and security functions. The serving gateway 562 is in communication with the PDN gateway 558, the RAN 551, and the SGSN 566. The SGSN 566 may perform MME selection and/or serving gateway selection.

The HSS 568 may have authentication and subscriber profile information, such as for a subscriber of the service request device 552, to access the PDN 556. The HSS 568, the MME 564, and/or the serving gateway 5162 may perform PDN, PDN gateway, and IP services selections. The selections may be based on PDN, PDN gateway, and IP service information provided by the service request device 552. For example only, the HSS 568 may authenticate the subscriber after an invoked tunnel establishment request by the service request device 552.

Figure 10B:
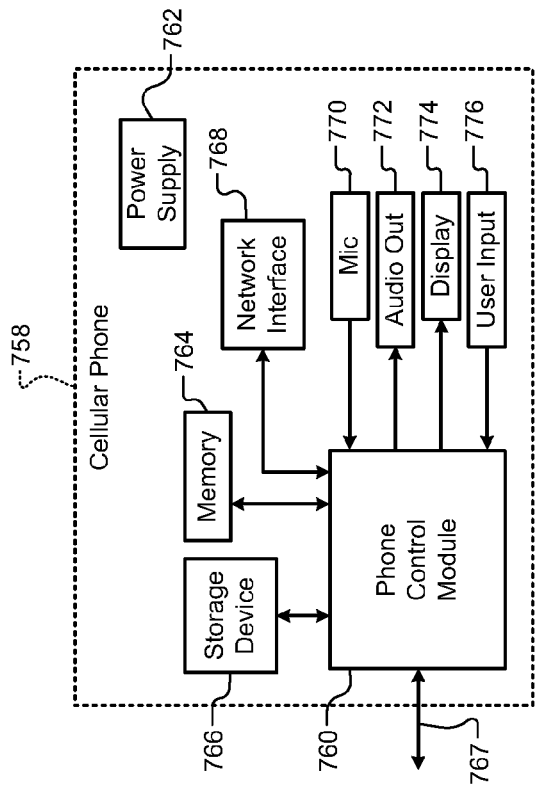
FIG. 10B is a functional block diagram of a cellular phone.
Figure 10A:
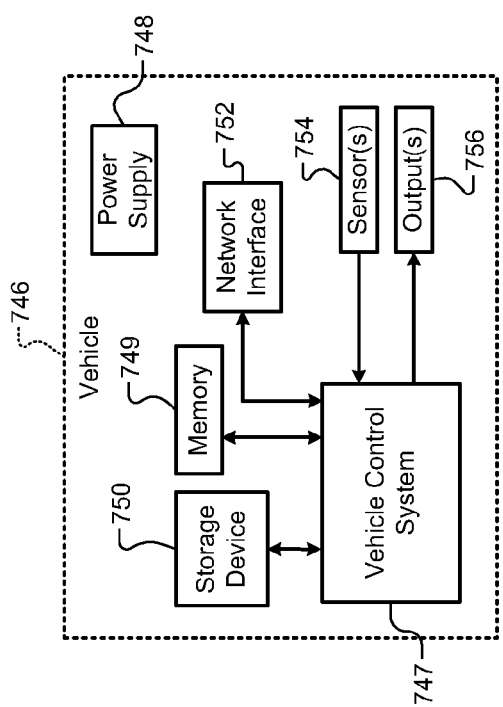
FIG. 10A is a functional block diagram of a vehicle control system.

Referring now to FIGS. 10A-10C, various exemplary implementations incorporating the teachings of the present disclosure are shown.

Referring now to FIG. 10A, the teachings of the disclosure may be implemented in a network interface 752 of a vehicle 746. The vehicle 746 may include a vehicle control system 747, a power supply 748, memory 749, a storage device 750, and the network interface 752. If the network interface 752 includes a wireless local area network interface, an antenna (not shown) may be included. The vehicle control system 747 may be a powertrain control system, a body control system, an entertainment control system, an anti-lock braking system (ABS), a navigation system, a telematics system, a lane departure system, an adaptive cruise control system, etc.

The vehicle control system 747 may communicate with one or more sensors 754 and generate one or more output signals 756. The sensors 754 may include temperature sensors, acceleration sensors, pressure sensors, rotational sensors, airflow sensors, etc. The output signals 756 may control engine operating parameters, transmission operating parameters, suspension parameters, brake parameters, etc.

The power supply 748 provides power to the components of the vehicle 746. The vehicle control system 747 may store data in memory 749 and/or the storage device 750. Memory 749 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 750 may include an optical storage drive, such as a DVD drive, and/or a hard disk drive (HDD). The vehicle control system 747 may communicate externally using the network interface 752.

Referring now to FIG. 10B, the teachings of the disclosure can be implemented in a cellular network interface 767 of a cellular phone 758. The cellular phone 758 includes a phone control module 760, a power supply 762, memory 764, a storage device 766, and the cellular network interface 767. The cellular phone 758 may include a network interface 768, a microphone 770, an audio output 772 such as a speaker and/or output jack, a display 774, and a user input device 776 such as a keypad and/or pointing device. If the network interface 768 includes a wireless local area network interface, an antenna (not shown) may be included.

The phone control module 760 may receive input signals from the cellular network interface 767, the network interface 768, the microphone 770, and/or the user input device 776. The phone control module 760 may process signals, including encoding, decoding, filtering, and/or formatting, and generate output signals. The output signals may be communicated to one or more of memory 764, the storage device 766, the cellular network interface 767, the network interface 768, and the audio output 772.

Memory 764 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 766 may include an optical storage drive, such as a DVD drive, and/or a hard disk drive (HDD). The power supply 762 provides power to the components of the cellular phone 758.

Referring now to FIG. 10C, the teachings of the disclosure can be implemented in a network interface 794 of a mobile device 789. The mobile device 789 may include a mobile device control module 790, a power supply 791, memory 792, a storage device 793, the network interface 794, and an external interface 799. If the network interface 794 includes a wireless local area network interface, an antenna (not shown) may be included.

The mobile device control module 790 may receive input signals from the network interface 794 and/or the external interface 799. The external interface 799 may include USB, infrared, and/or Ethernet. The input signals may include compressed audio and/or video, and may be compliant with the MP3 format. Additionally, the mobile device control module 790 may receive input from a user input 796 such as a keypad, touchpad, or individual buttons. The mobile device control module 790 may process input signals, including encoding, decoding, filtering, and/or formatting, and generate output signals.

The mobile device control module 790 may output audio signals to an audio output 797 and video signals to a display 798. The audio output 797 may include a speaker and/or an output jack. The display 798 may present a graphical user interface, which may include menus, icons, etc. The power supply 791 provides power to the components of the mobile device 789. Memory 792 may include random access memory (RAM) and/or nonvolatile memory.

Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 793 may include an optical storage drive, such as a DVD drive, and/or a hard disk drive (HDD). The mobile device may include a personal digital assistant, a media player, a laptop computer, a gaming console, or other mobile computing device.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network device comprising:
   a transceiver configured to (i) transmit N packets to a first access point, and (ii) receive a control message from a second access point, where N is an integer, and wherein the N packets include a first packet and a second packet, and
   the control message indicates (i) reception of M of the N packets including the first packet by the second access point from the first access point during a handover of the network device from the first access point to the second access point, and (ii) reception of a redundant packet by the second access point, where M is an integer less than N, wherein the handover of the network device from the first access point to the second access point occurs prior to the control message being received by the transceiver; and
   a control module configured to (i) begin transmitting the first packet to the second access point via the transceiver, and then (ii) receive the control message from the second access point, wherein the control module is configured to (i) detect transmission of the redundant packet based on the control message, and (ii) the first packet and the second packet to the second access point in response to detecting the transmission of the redundant packet, wherein the control module is configured to transmit N-M of the N packets to the second access point via the transceiver (i) subsequent to receiving the control message, and (ii) in response to a predetermined period expiring, wherein the N-M packets were unsuccessfully transmitted from the first access point to the second access point, and wherein the control module is configured to discard the M packets (i) prior to the predetermined period expiring, and (ii) in response to the control message.

2. The network device of claim 1, wherein:
the first access point received the first packet in a first radio access network; and
the second access point received the first packet in a second radio access network.

3. The network device of claim 1, wherein the control message is (i) initially generated within a packet data convergence protocol layer of the second access point, or (ii) initially generated as a packet data convergence protocol layer control packet data unit.

4. The network device of claim 1, wherein the transceiver is configured to transmit:
a first set of service data units to the first access point, the first set of service data units including the N packets; and
a second set of service data units to the second access point, the second set of service data units including the one of the N packets.

5. The network device of claim 1, wherein the transceiver is configured to receive the control message prior to transmitting the one of the N packets to the second access point.

6. The network device of claim 1, wherein the transceiver is configured to transmit the one of the N packets to the second access point based on reception of an acknowledgement signal from the first access point.

7. A target access point comprising:
a transceiver configured to receive M of N packets associated with a service request device, where N and M are integers and M is less than N, and wherein
the N packets include a first packet and a second packet,
the M packets are received by the transceiver from a first access point during a handover of the service request device from the first access point to the target access point,
the N packets are transmitted from the service request device to the first access point; and
a control module configured to generate a control message,
wherein the control message indicates (i) reception of the M packets including the first packet by the transceiver from the first access point, and (ii) reception of a redundant packet by the transceiver,
wherein the control module is configured to (i) begin receiving the first packet from the service request device, and then (ii) detect the reception of the redundant packet,
wherein the transceiver is configured to, in response to detecting the reception of the redundant packet, transmit the control message to the service request device to prevent the service request device from transmitting the first packet and the second packet, to the target access point, wherein the control module is configured to receive N-M of the N packets from the service request device via the transceiver (i) subsequent to transmitting the control message, and (ii) in response to a predetermined period expiring, wherein the N-M packets were unsuccessfully transmitted from the first access point to the target access point, and wherein the service request device discards the M packets (i) prior to the predetermined period expiring, and (ii) in response to the control message.

8. The target access point of claim 7, wherein the service request device is configured to transmit the N packets to the first access point prior to the handover of the service request device from the first access point to the target access point.

9. The target access point of claim 7, wherein the control message is (i) initially generated within a packet data convergence protocol layer of the transceiver, or (ii) initially generated as a packet data convergence protocol layer control packet data unit.

10. The target access point of claim 7, wherein the transceiver is configured to receive the one of the N packets from the service request device based on reception of an acknowledgement signal by the service request device from the first access point.

11. A method of operating a target access point, the method comprising:
receiving M of N packets associated with a service request device via a transceiver, where M and N are integers and M is less than N, and wherein
the N packets include a first packet and a second packet,
the M packets are received by the transceiver from a first access point during a handover of the service request device from the first access point to the target access point, and
the N packets are transmitted from the service request device to the first access point;
generating a control message,
wherein the control message indicates (i) reception of the M packets including the first packet by the transceiver from the first access point, and (ii) reception of a redundant packet by the transceiver;
beginning reception of the first packet from the service request device;
detecting the reception of the redundant packet subsequent to beginning reception of the first packet;
in response to detecting the reception of the redundant packet, transmitting the control message to the service request device to prevent the service request device from transmitting the packets first packet and the second packet to the target access point; and
receiving N-M of the N packets from the service request device via the transceiver (i) subsequent to transmitting the control message, and (ii) in response to a predetermined period expiring, wherein the N-M packets were unsuccessfully transmitted from the first access point to the target access point, wherein the service request device discards the M packets (i) prior to the predetermined period expiring, and (ii) in response to the control message.

12. The network device of claim 1, wherein:
the transceiver is configured to transmit a message window signal to the second access point subsequent to (i) the predetermined period expiring, (ii) transmission of the N-M packets from the transceiver to the second access point, or (iii) refraining from transmitting the first packet and the second packet; and
the message window signal indicates (i) transmission of the N-M packets from the transceiver to the second access point, and (ii) the transceiver discarding the N-M packets.

13. The network device of claim 1, wherein the redundant packet includes the first packet.

* * * * *